United States Patent
Ode et al.

(10) Patent No.: US 8,996,026 B2
(45) Date of Patent: Mar. 31, 2015

(54) SCHEDULING SYSTEM FOR RADIO COMMUNICATION NETWORKS

(75) Inventors: Takayoshi Ode, Kawasaki (JP); Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 916 days.

(21) Appl. No.: 11/826,123

(22) Filed: Jul. 12, 2007

(65) Prior Publication Data
US 2008/0020779 A1 Jan. 24, 2008

Related U.S. Application Data

(63) Continuation of application No. PCT/JP2005/000284, filed on Jan. 13, 2005.

(51) Int. Cl.
*H04W 72/00* (2009.01)
*H04W 4/00* (2009.01)
(Continued)

(52) U.S. Cl.
CPC ............. *H04W 72/08* (2013.01); *H04L 1/0015* (2013.01); *H04L 1/0026* (2013.01);
(Continued)

(58) Field of Classification Search
CPC ... H04L 5/0035; H04L 5/0048; H04L 5/0053; H04L 1/0002; H04L 1/0015; H04L 1/0026; H04L 1/0028; H04L 1/0033; H04L 5/006; H04L 5/0064; H04L 5/0078; H04L 27/0008; H04W 15/14; H04W 72/04; H04W 72/0426; H04W 4/00; H04W 36/06; H04W 36/14; H04W 36/30; H04W 72/00; H04W 72/1226; H04W 72/1278

USPC ................... 455/434, 452.2, 450–454, 552.1; 370/310–350
See application file for complete search history.

(56) References Cited

U.S. PATENT DOCUMENTS 5,774,808 A * 6/1998 Sarkioja et al. ............... 455/436
7,330,699 B2 * 2/2008 Chuah et al. ............... 455/67.11
(Continued)

FOREIGN PATENT DOCUMENTS

JP 04-004621 A 1/1992
JP 01-036964 A 2/2001
(Continued)

OTHER PUBLICATIONS

3GPP TS 25.211 V5.6.0(Sep. 2004) 3rd Generation Partnership Project; Technical Specification Group Radio Access network; Physical channels and mapping of transport channels onto physical channels (FDD) (Release 5), pp. 1-51.
(Continued)

*Primary Examiner* — Dwayne Bost
*Assistant Examiner* — Larry Sternbane
(74) *Attorney, Agent, or Firm* — Fujitsu Patent Center

(57) ABSTRACT

A scheduling process handles a plurality of communication services in a collective manner, thus making a radio communications system more operable. A pilot signal sender sends pilot signals with carrier frequencies each corresponding to an N (N≥1) different communication services. A scheduler collects N×n instances of propagation environment data from n (n≥1) terminal devices and selects terminal devices and communication services therefor by assigning terminal devices having a better propagation environment to the plurality of different communication services in a collective manner. The pilot signals are used by a propagation environment data sender to measure and report a propagation environment of each carrier frequency. A communication function configurer automatically sets up a communication function to adapt to the communication service that the base station has assigned.

17 Claims, 22 Drawing Sheets

(51) Int. Cl.

| | | |
|---|---|---|
| *H04M 1/00* | (2006.01) | |
| *H04W 72/08* | (2009.01) | |
| *H04L 1/00* | (2006.01) | |
| *H04W 36/30* | (2009.01) | |
| *H04W 72/12* | (2009.01) | |
| *H04L 27/00* | (2006.01) | |
| *H04L 5/00* | (2006.01) | |
| *H04W 36/06* | (2009.01) | |
| *H04W 36/14* | (2009.01) | |

(52) U.S. Cl.
CPC ........... *H04L 1/0028* (2013.01); *H04L 1/0033* (2013.01); *H04W 36/30* (2013.01); *H04W 72/1226* (2013.01); *H04L 27/0008* (2013.01); *H04L 5/0053* (2013.01); *H04L 1/0002* (2013.01); *H04W 36/06* (2013.01); *H04W 36/14* (2013.01); *H04W 72/1278* (2013.01); *H04L 5/006* (2013.01); *H04L 5/0064* (2013.01); *H04L 5/0078* (2013.01)
USPC .................. 455/452.2; 455/434; 455/552.1

(56) References Cited

U.S. PATENT DOCUMENTS

| | | | |
|---|---|---|---|
| 7,391,715 B2 * | 6/2008 | Lee et al. ................. | 370/208 |
| 7,499,705 B2 * | 3/2009 | Rimoni et al. ............. | 455/436 |
| 2004/0203476 A1 | 10/2004 | Liu | |
| 2004/0213144 A1 | 10/2004 | Murakami et al. | |
| 2006/0089102 A1 | 4/2006 | Nishio et al. | |

FOREIGN PATENT DOCUMENTS

| | | |
|---|---|---|
| JP | 01-054168 A | 2/2001 |
| JP | 01-119741 A | 4/2001 |
| JP | 02-135847 A | 5/2002 |
| JP | 2003-032745 | 1/2003 |
| JP | 2003-152679 | 5/2003 |
| JP | 2003-529978 A | 10/2003 |
| JP | 2004-135305 | 4/2004 |
| JP | 04-179693 A | 6/2004 |
| JP | 2004-208234 | 7/2004 |
| JP | 04-312635 A | 11/2004 |
| JP | 05-006293 A | 1/2005 |
| JP | 4723036 | 7/2011 |
| WO | WO 0154337 A1 * | 7/2001 ................ H04L 1/00 |

OTHER PUBLICATIONS

3GPP TS 25.212 V5.9.0 (Jun. 2004) "3rd Generation Partnership Project; Technical Specification Group Radio Access Network; Multiplexing and channel coding" (FDD) (Release 5), pp. 1-76.
3GPP TS 25.213 V5.5.0 (Dec. 2003) 3rd Generation Partnership Project; Technical Specification Group Radio Access Network; Spreading and modulation (FDD) (Release 5), pp. 1-28.
3GPP TS 25.214 V5.9.0 (Jun. 2004) 3rd Generation Partnership Project; Technical Specification Group Radio Access Network; Physical layer procedures (FDD) (Release 5), pp. 1-64.
3GPP TS 23.107 V5.12.0 (Mar. 2004) 3rd Generation Partnership Project; Technical Specification Group Services and System Aspects; Quality of Service (QoS) Concept and Architecture (Release 5), pp. 1-41.
3GPP TS 25.321 V5.9.0 3rd Generation Partnership Project; Technical Specification Group Radio Access Network; Medium Access Control (MAC) Protocol Specification (Release 5), pp. 1-61.
A. Jalali et al., "Data Throughout of CDMA-HDR a High Efficiency-High Data Rate Personal Communication Wireless System" Qualcomm, Inc., Proc. IEEE VTC2000, (2000 Spring), pp. 1854-1858.
Y. Ofuji, et al., Comparisons of Packet Scheduling Methods Focusing on Throughput of Each User in High Speed Downlink Packet Access, Wireless Laboratories , NTT DoCoMo, Inc., Technical Report of IEICE, RCS2001-291, pp. 51-58, with English Translation.
Japanese Patent Office Action with Partial English Translation for corresponding Japanese Patent Application No. 2006-552797; Issue date Jul. 14, 2009.
Japanese Patent Office Office Action for corresponding Japanese Patent Application No. 2006-552797, issued on Oct. 13, 2009; Partial English translation attached.
Japanese Office Action mailed by JPO and corresponding to Japanese application No. 2011-241102 on Sep. 18, 2012, with English translation.
European Search Report dated Feb. 1, 2013 for corresponding European Application No. 05703523.0.
European Office Action dated Jun. 14, 2013 for corresponding European Application No. 05703523.0.

* cited by examiner

FIG. 12

PILOT SIGNAL f1p (HSDPA)

| | CQI(f1) | REQUIRED TX RATE (Mbps) | CQI(f2) |
|---|---|---|---|
| UE 20-1 | 12 | 1.0 | 12 |
| UE 20-2 | 08 | 3.0 | 08 |
| UE 20-3 | 19 | 10.0 | 20 |
| UE 20-4 | 10 | 2.0 | 10 |
| UE 20-5 | 13 | 0.5 | 13 |

PILOT SIGNAL f2p (OFDM)

| | CQI(f1) | REQUIRED TX RATE (Mbps) | CQI(f2) | |
|---|---|---|---|---|
| | 04 | 2.0 | 05 | UE 20-6 |
| | 17 | 8.0 | 16 | UE 20-7 |
| | 15 | 6.0 | 14 | UE 20-8 |
| | 19 | 15.0 | 19 | UE 20-9 |
| | 12 | 10.0 | 11 | UE 20-10 |

SCHEDULING FOR f1 & f2

→ UE 20-3, 20-9
(TOTAL REQUIRED TX RATE OF f2: 25.0 Mbps)

UE 20-7, 20-8
(TOTAL REQUIRED TX RATE OF f1: 14.0 Mbps)

TOTAL TX RATE OF f1 & f2: 39.0 Mbps

|        | CQI | TX RATE |
|--------|-----|---------|
| UE 121 | 08  | 3.0     |
| UE 122 | 19  | 10.0    |
| UE 123 | 10  | 2.0     |
| UE 124 | 13  | 0.5     |

FIG. 20
PRIOR ART

SCHEDULING SYSTEM FOR RADIO COMMUNICATION NETWORKS

This application is a continuation application, filed under 35 U.S.C. §111(a), of International Application PCT/JP2005/000284, filed Jan. 13, 2005, the entire contents of which are incorporated herein by reference.

BACKGROUND OF THE INVENTION

1. Field of the Invention

The present invention relates to radio communications systems, and more particularly to a radio communications system using Wideband Code Division Multiple Access (W-CDMA) or other radio communication techniques.

2. Description of the Related Art

W-CDMA is one of the most accepted air interfaces of those standardized as the International Mobile Telecommunications 2000 (IMT-2000). With its maximum transmission rate of 384 Kbps, W-CDMA enables access to multimedia content including voice, video, and other types of data.

Recent research and development efforts have been directed to a W-CDMA-based wireless communications system called "High Speed Downlink Packet Access" (HSDPA). HSDPA, standardized as part of the Third Generation Partnership Project (3GPP) Release 5 specifications, offers a wireless access system for the 3.5th generation mobile communications system with a maximum transmission rate of 14.4 Mbps (average 2 to 3 Mbps) for downlink packets, which is three to four times as fast as the current W-CDMA downlink channels.

FIG. 18 gives an overview of HSDPA. Mobile phones 111 to 113 and notebook computers 114 and 115 are located in a cell 100*a* managed by a base station 100. It is assumed here that the base station 100 uses conventional W-CDMA to send downlink packets to the mobile phone 111 and notebook computer 114, while using HSDPA to do the same for the mobile phones 112 and 113 and notebook computer 115.

W-CDMA allows the mobile phone 111 and notebook computer 114 to receive packets from the base station 100 at a fixed rate (max 384 Kbps) wherever they are in the cell 100*a*.

HSDPA, on the other hand, may vary the downlink rate even within the same cell 100*a*, depending on the distance from the base station or other conditions. Specifically, HSDPA chooses the fastest modulation method at the moment, according to the current condition of radio wave signals arriving at each terminal device.

Suppose, for example, that the mobile phone 112 and notebook computer 115 are located near the base station 100, and that there are no particular obstacles between them, allowing signals to be received in good condition. In this case, the mobile phone 112 and notebook computer 115 can receive data at the maximum rate of 14.4 Mbps. Suppose now that the mobile phone 113 is located somewhere near the edge of the cell 100*a*, away from the base station 100, and it is thus receiving signals in bad condition. In this case, the mobile phone 113 can only achieve a data rate of lower than 14.4 Mbps.

As the above example shows, HSDPA uses adaptive modulation coding to optimize the downlink transmission rates according to the current reception condition. Specifically, HSDPA can switch between two modulation methods. One method is quadrature phase shift keying (QPSK), which is used in W-CDMA systems. QPSK modulation produces four phase variations in a carrier wave, so that it can convey data at two bits per symbol. The other method is quadrature amplitude modulation (16QAM), which produces sixteen states for phase and amplitude combinations, thus permitting data transmission of four bits per symbol.

HSDPA allows the base station 100 to include a scheduler implementing a technique called "adaptive scheduling" (hereafter, "scheduling"). This feature makes it possible to prioritize users depending on the radio wave condition.

HSDPA enables high-speed transfer of downlink packets without much need for modifying existing mobile communication networks. That is, HSDPA can be introduced as a new feature without impacting the existing system. Because of this backward compatibility, HSDPA is expected to be a highly promising technology for wideband mobile communication service.

As a conventional technique, there is a proposed technique for selecting radio communication resources such as frequency band and radio wave space according to the characteristics of applications (see, for example, Japanese Patent Application Publication 2004-179693, paragraph Nos. 0028 to 0038, FIG. 1).

The process of the above scheduling is as follows. First, the base station sends a pilot signal with a specific carrier frequency, so that mobile terminals such as cellular phones in the cell will receive the signal. Each receiving mobile terminal measures its current propagation environment for the received pilot signal and sends the result back to the base station as propagation environment data. The base station then selects mobile terminals having a better propagation environment and gives them a higher priority in sending traffic data. The conventional scheduler selects, among others, the number of mobile terminals and the order of selected mobile terminals in data transmission.

Here the term "propagation environment data" refers specifically to Channel Quality Indicator (CQI), which is an index representing the electric field strength of a received pilot signal. More specifically, CQI ranges from 1 to 30 to represent the carrier-to-interference ratio (C/I ratio, or CIR) of a pilot signal.

More specifically, CQI=1 represents a worst CIR, or the lowest receive level. CQI=30, on the other hand, represents a best CIR, or the highest receive level. The scheduler selects terminals in descending order of CIR. This CIR-based scheduling is called the maximum C/I method, and HSDPA uses this method.

FIG. 19, shows a conventional HSDPA scheduling. Located in the cell 100*b* of a base station 100-1 are mobile terminals (referred to herein as user equipment, or UE) 121 to 124. Those UEs 121 to 124 are HSDPA terminal devices, and the base station 100-1 sends them a pilot signal f1*p* with a carrier frequency f1 for HSDPA as indicated by the dotted arrows in FIG. 19.

Upon receipt of the pilot signal f1*p*, each UE 121 to 124 calculates a CQI and sends it back to the base station 100-1 as indicated by the solid arrows in FIG. 19. The base station 100-1 has a scheduler 101, which performs a scheduling process based on the received CQIs.

FIG. 20 shows a scheduling model. It is assumed that UEs 121 to 124 have returned their respective CQIs 08, 19, 10, and 13 in response to an HSDPA pilot signal f1*p*. It is also assumed that the UEs 121 to 124 have transmission rates of 3.0, 10.0, 2.0, and 0.5 (Mbps), respectively, in the downlink direction (i.e., base station to UE). The transmission rate of a UE is a function of the amount of transmit data, modulation method, and other parameters. Once the scheduling process selects a UE, its transmission rate will be determined accordingly.

The scheduling algorithm in the present example is supposed to select two terminal devices with high CQIs, such that data transmission will proceed in descending order of CQI. However, the maximum transmission rate of HSDPA is 14.4 Mbps as mentioned above. For this reason, the scheduling algorithm has to select terminal devices in such a way that they will not exceed the limit of total transmission rate.

The scheduler discovers that, of all the UEs 121 to 124, the UE 122 has the highest CQI of 19, and that the UE 124 with a CQI of 13 ranks as the second. The total transmission rate of those UEs 122 and 124 is 10.5 Mbps, which falls within the maximum transmission rate of HSDPA.

Thus the scheduler prioritizes the above UEs 122 and 124 selected from among the UEs 20-1 to 20-10 in the cell 100b. The base station 100-1 then sends downlink data first to the former UE 122 and then to the latter UE 124.

However, the above-described conventional scheduling mechanism needs an increased number of base station components in the case where the service uses a plurality of different carrier frequencies. This is because the conventional scheduling requires the base station to have a scheduler dedicated for each carrier frequency.

FIG. 21 shows a conventional system with multiple schedulers. The illustrated base station 100-2 has a cell 100c accommodating UEs 131 to 133 together with UEs 141 to 146. The base station 100-2 provides two kinds of communication services, for each of which it sends a pilot signal with a particular carrier frequency. Specifically, one pilot signal f1p has a carrier frequency f1, while the other pilot signal f2p has a carrier frequency f2. One group of UEs 131 to 133 use a communication service with the carrier frequency f1, while the other group of UEs 141 to 146 use a communication service with the carrier frequency f2.

According to the conventional system, the base station 100-2 contains schedulers 101a and 101b for services corresponding to the carrier frequencies f1 and f2, respectively.

The scheduler 101a performs scheduling of UEs 131 to 133 based on their CQIs received as a response to the pilot signal f1p. The scheduler 101b, on the other hand, performs scheduling of UEs 141 to 146 based on their CQIs received as a response to the pilot signal f2p.

As can be seen from the above example, the conventional system has a scheduler for each carrier frequency (or for each communication service) to provide multiple communication services. The more components are integrated, the more difficult it becomes to operate the system.

In the system using a plurality of carrier frequencies f1 and f2 to provide service, the decision of whether to select a UE or not depends on which carrier frequency to use for that UE. Think of, for example, a UE with a low priority in one carrier frequency f1. The same UE may, however, win a high priority for another carrier frequency f2.

FIG. 22 shows a change in priority. In the example of FIG. 22, the scheduler is supposed to select two high-CQI UEs for each carrier frequency f1 and f2. Specifically, UEs 131 and 132 are selected for one carrier frequency f1, and UEs 141 and 142 for the other carrier frequency f2. In the group of carrier frequency f2, the UE 143 is at the third place, thus not selected at the moment.

If the UE 143 was allowed to move to the service of carrier frequency f1, the UE 143 would replace the UE 132 since the CQI ranking among UEs 131, 132, and 143 in the operation environment of carrier frequency f1 would be as follows: UE 131>UE 143>UE 132. (With the original service usage, the carrier frequency f2 is shared by six UEs, whereas the carrier frequency f1 is shared by three UEs. This simply means that f2 is likely to experience a greater interference (or a poorer CIR) than f1. While the UE 143 ranks as the third in terms of CQI at the interference-prone carrier frequency f2, it is possible for the same UE 143 to gain a better CQI if it moves to the carrier frequency f1 with less interference.)

An inter-frequency handover takes place when the system has to change carrier frequencies from f2 to f1. However, this inter-frequency handover imposes a heavy processing load not only on the base station, but also on its upper-level stations in the conventional system using frequency-specific scheduling. The workload of control tasks spoils the advantage of higher transmission rates, thus making the system less operable.

Further, the conventional scheduling based on individual services could introduce unevenness in the processing load among different communication services. Think of a situation where one scheduler 101a is taking care of only two mobile terminals whereas the other scheduler 101b has to deal with ten mobile terminals, while each scheduler 101a and 101b is supposed to select four high-CQI mobile terminals. The former scheduler 101a has a spare capacity in this situation. This means that the two schedulers for different communication services experience uneven processing loads, thus failing to increase the system's total transmission rate.

SUMMARY OF THE INVENTION

In view of the foregoing, it is an object of the present invention to provide a radio communications system having a scheduler that handles a plurality of different communication services in a collective manner, so as to achieve an improved operability of radio communication.

To accomplish the above object, the present invention provides a radio communications system. This radio communications system comprises a base station that offers N (N≥1) different communication services, the base station comprising: a pilot signal sender that sends pilot signals with carrier frequencies each corresponding to the N communication services, a scheduler that collects N×n instances of propagation environment data from n (n≥1) terminal devices and selects terminal devices and communication services therefor by assigning terminal devices having a better propagation environment to the plurality of different communication services in a collective manner, and a control parameter sender that sends control parameters necessary for the selected communication service to each terminal device selected by the scheduler; and mobile terminals capable of receiving the plurality of different communication services, each mobile terminal comprising: a propagation environment data sender that receives the N pilot signals with different carrier frequencies, measures a propagation environment for each of the carrier frequencies, and sends the N instances of propagation environment data back to the base station, and a communication function configurer that sets up a communication function corresponding to the selected communication service that the base station has assigned, based on the control parameters.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 shows a scheduling model.

FIG. 20 shows a scheduling model.

DESCRIPTION OF THE PREFERRED EMBODIMENTS

Figure 1:
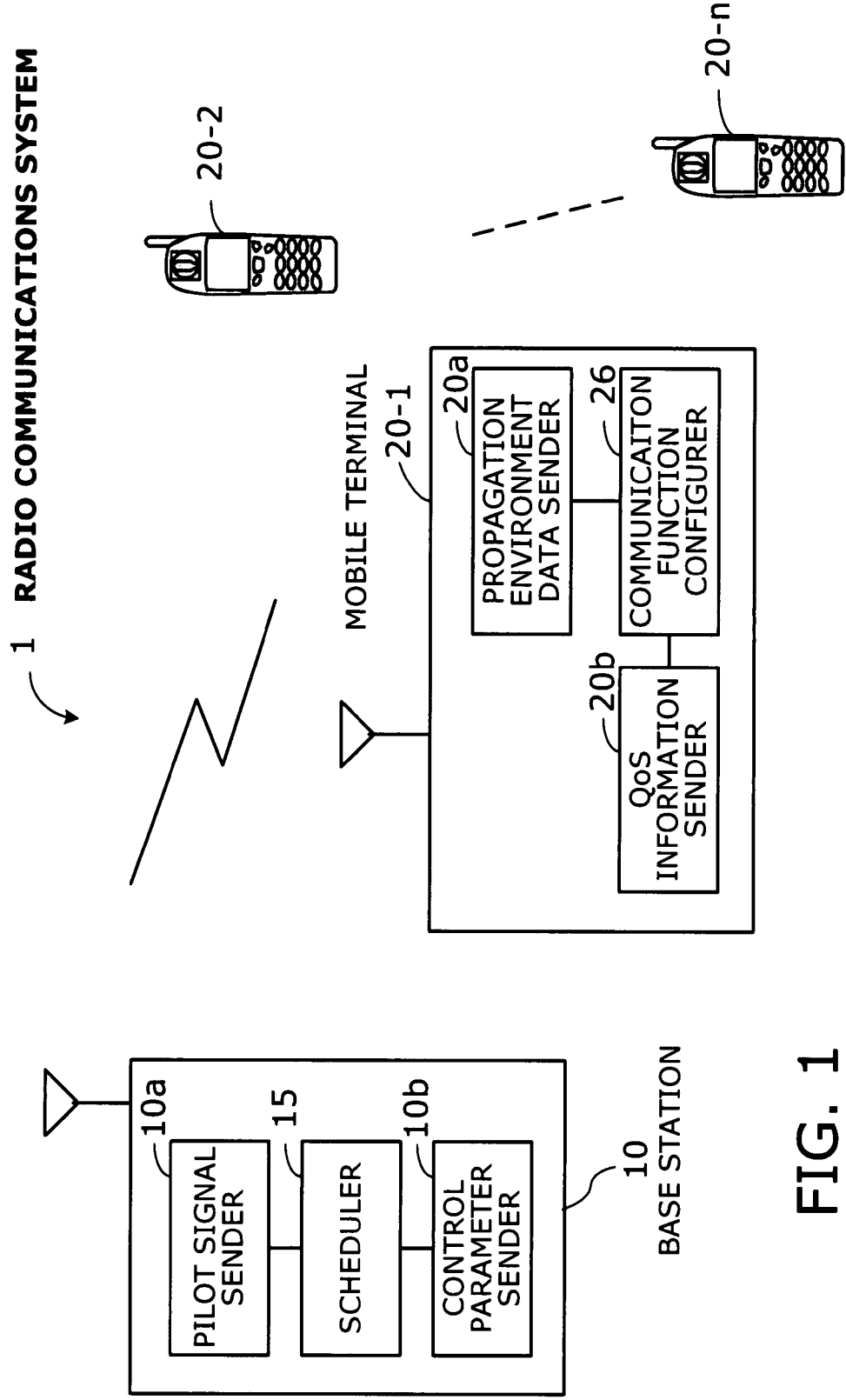
FIG. 1 is a conceptual view of a radio communications system.

Preferred embodiments of the present invention will be described below with reference to the accompanying drawings. FIG. 1 is a conceptual view of a radio communications system 1 according to a first embodiment of the invention. This radio communications system 1 is formed from a base station 10 and n mobile terminals 20-1 to 20-n (n≥1) connected by high-speed wireless links.

The base station 10 is a radio base station that can offer a plurality (N) of different communication services at a time. The base station 10 includes a pilot signal sender 10a, a scheduler 15, and a control parameter sender 10b.

The pilot signal sender 10a sends pilot signals with carrier frequencies corresponding to the N different communication services. Suppose, for example, that the base station supports two communication services A and B. In this case, the pilot signal sender 10a sends two pilot signals, one with a carrier frequency $f_A$ for communication service A and the other with a carrier frequency fB for communication service B.

The scheduler 15 in the base station 10 collects N×n instances of propagation environment data from n terminal devices (i.e., mobile terminals 20-1 to 20-n). Suppose, for example, that three mobile terminals can receive two communication services A and B. In this case, each mobile terminal sends propagation environment data for both communication services A and B, thus allowing the scheduler 15 to collect six instances of propagation environment data. Such propagation environment data includes, for example, channel quality indicators (CQIs) measured at each mobile terminal.

The scheduler 15 performs a scheduling process (i.e., a process determining with which entities to communicate) for the plurality of different communication services in a collective manner. Specifically, the scheduler 15 selects mobile terminals and communication services therefor by assigning mobile terminals having a better propagation environment to the plurality of different communication services in a collective manner.

The control parameter sender 10b sends control parameters necessary for the selected communication service to each mobile terminal selected by the scheduler 15. The control parameters informs the receiving mobile terminal of, for example, the assigned communication service, transmission rate, and modulation method.

Each mobile terminal 20-1 to 20-n has the ability of receiving different communication services (by selecting a single or multiple communication services). The mobile terminals 20-1 to 20-n each include a propagation environment data sender 20a, a communication function configurer 26, and a QoS information sender 20b.

The propagation environment data sender 20a receives N pilot signals with different carrier frequencies, measures the current propagation environment for each carrier frequency (or for each communication service), and sends N instances of propagation environment data back to the base station 10, thus reporting the measurement result.

When the base station 10 has selected a specific mobile terminal and a communication service for that terminal, the communication function configurer 26 sets up a communication function corresponding to the selected service autonomously (automatically) according to given control parameters. The QoS information sender 20b sends QoS information to the base station 10. Details of QoS-related operation will be described later with reference to FIG. 12.

Some terminals can receive different communication services while the others can only receive a single communication service. The present invention allows such different types of terminals to coexist in the cell of the base station 10.

Figure 2:
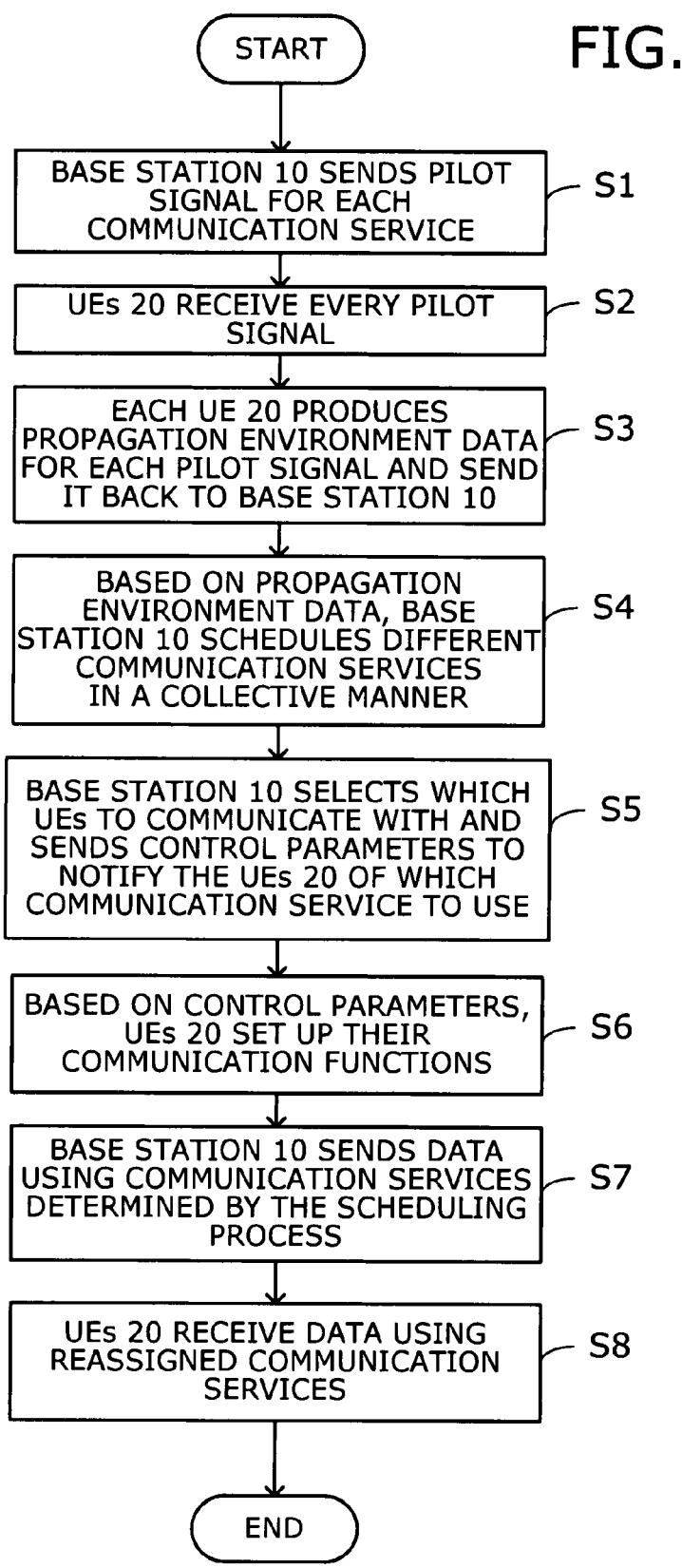
FIG. 2 is a flowchart showing how the radio communications system operates.

Referring now to the flowchart of FIG. 2, the following will describe the overall operation of the radio communications system 1. Hereafter, the term "UE" will be used to refer to a mobile terminal. Also, the reference numeral 20 refers collectively to the UEs 20-1 to 20-n.

(S1) The base station 10 sends out a pilot signal for each communication service.

(S2) The UEs 20 receive every pilot signal.

(S3) Each UE 20 measures its propagation environment for each received pilot signal and sends the resultant propagation environment data back to the base station 10.

(S4) Based on the propagation environment data, the base station 10 schedules different communication services in a collective manner.

(S5) The base station 10 selects which UEs to communicate with and sends control parameters to notify the selected UEs 20 of which communication service to use.

(S6) Based on the control parameters, the receiving UEs 20 set up their respective communication functions autonomously.

(S7) The base station 10 sends data using the communication services determined by the scheduling process.

(S8) The UEs 20 receive the data using the reassigned communication services and thus proceeds to a radio communication session via the base station 10.

The following will describe the operation of the radio communications system 1 in greater detail, assuming that the base station 10 supports two communication services including HSDPA and Orthogonal Frequency Division Multiplexing (OFDM) services.

OFDM is a digital modulation technique that uses a large number of orthogonal subcarriers within a given transmission frequency band and carries data by modulating the amplitude and phase of each subcarrier.

The OFDM architecture can deal with intersymbol interference caused by multipath fading. Because of this advantage, OFDM has been a primary choice for digital terrestrial broadcast systems, which are prone to suffer from multipath distortion. In recent years, researchers study the use of OFDM in mobile terminal devices including cellular phones as a radio access method for the fourth-generation mobile communications system.

Figure 3:
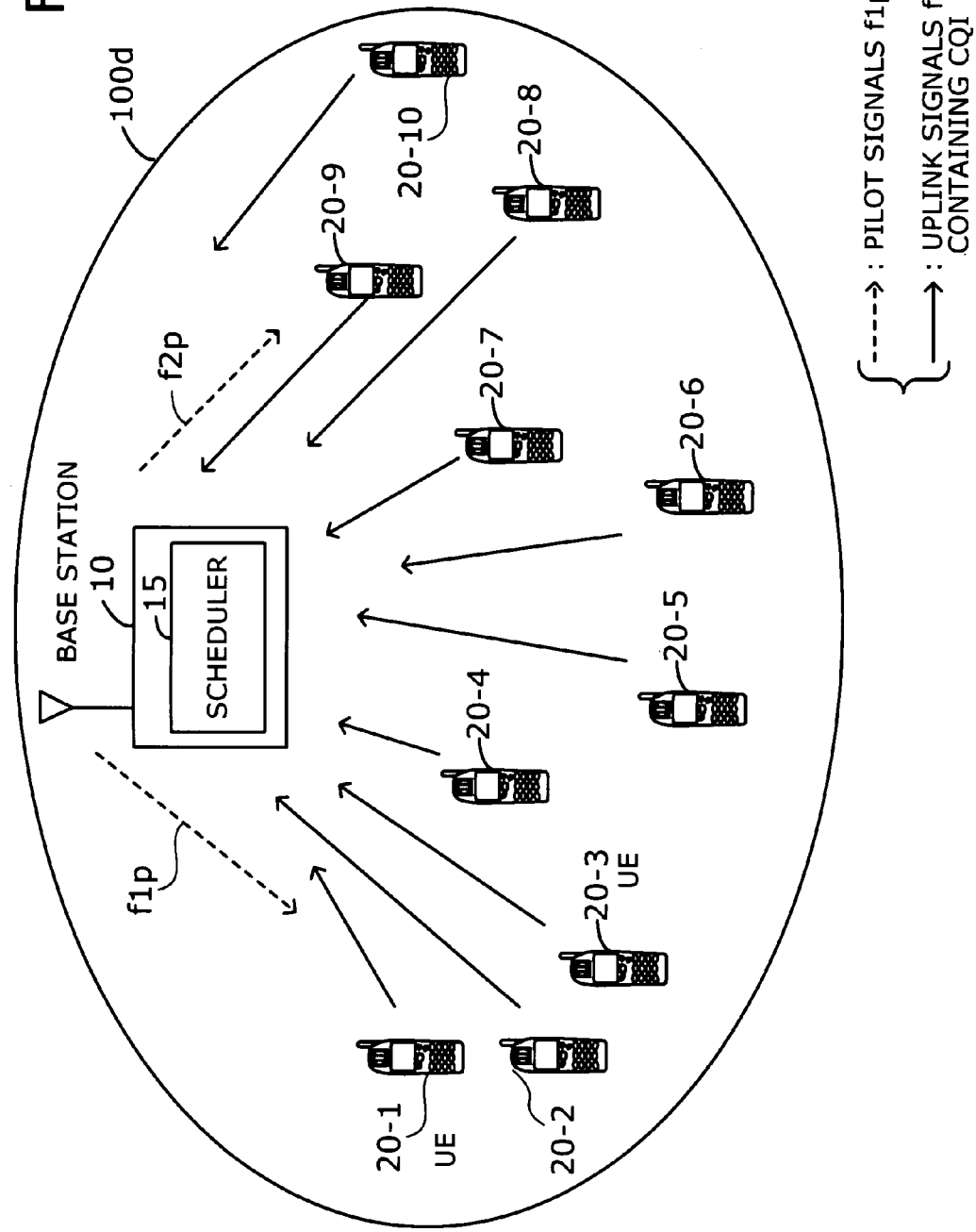
FIG. 3 shows an example of how the radio communications system operates.

FIG. 3 shows an example of how the radio communications system 1 operates. The base station 10 offers two types of communication services, HSDPA and OFDM, to UEs 20-1 to 20-10 in its cell 100d.

UEs 20-1 to 20-10 are mobile terminals having multiple communication functions to support both HSDPA and OFDM. By switching between the two communication functions, the UEs 20-1 to 20-10 can communicate through either HSDPA or OFDM radio channels.

Suppose now that UEs 20-1 to 20-5 are currently using HSDPA, while the other UEs 20-6 to 20-10 OFDM. This assignment of services is subjected to a scheduling process described below.

The base station 10 sends a pilot signal f1$p$ with a carrier frequency f1 corresponding to HSDPA. The base station 10 also sends another pilot signal f2$p$ with a carrier frequency f2 corresponding to OFDM.

Upon receipt of one pilot signal f1$p$, each UE 20-1 to 20-10 calculates a CQI representing the propagation environment for carrier frequency f1. The UEs 20-1 to 20-10 then send their respective CQIs back to the base station 10. Likewise, upon receipt of the other pilot signal f2$p$, each UE 20-1 to 20-10 calculates a CQI representing the propagation environment for carrier frequency f2. The UEs 20-1 to 20-10 then send their respective CQIs back to the base station 10. For example, the UE 20-1 informs the base station 10 of CQIs calculated for carrier frequencies f1 and f2. The other UEs do the same for the pilot signals that they have received.

The pilot signals f1$p$ and f2$p$ may have the same frequency bandwidth or different frequency bandwidths. It is assumed that the UEs 20-1 to 20-10 use different carrier frequencies f1$u$ and f2$u$ for uplink communication with the base station 10. The following sections refer to those signals as "uplink signals" where appropriate. UEs may receive pilot signals f1$p$ and f2$p$ at the same time or at separate times.

The scheduler 15 in the base station 10 receives uplink signals f1$u$ and f2$u$, thus collecting ten CQIs for one carrier frequency f1 from UEs 20-1 to 20-10, as well as another ten CQIs for the other carrier frequency f2. Based on those CQIs, the scheduler 15 performs scheduling of a plurality of different communication services in a collective manner. Where appropriate, the following part of the description will use the term "unified scheduling" to refer to this collective scheduling of a plurality of different communication services according to the present invention.

Figure 4:
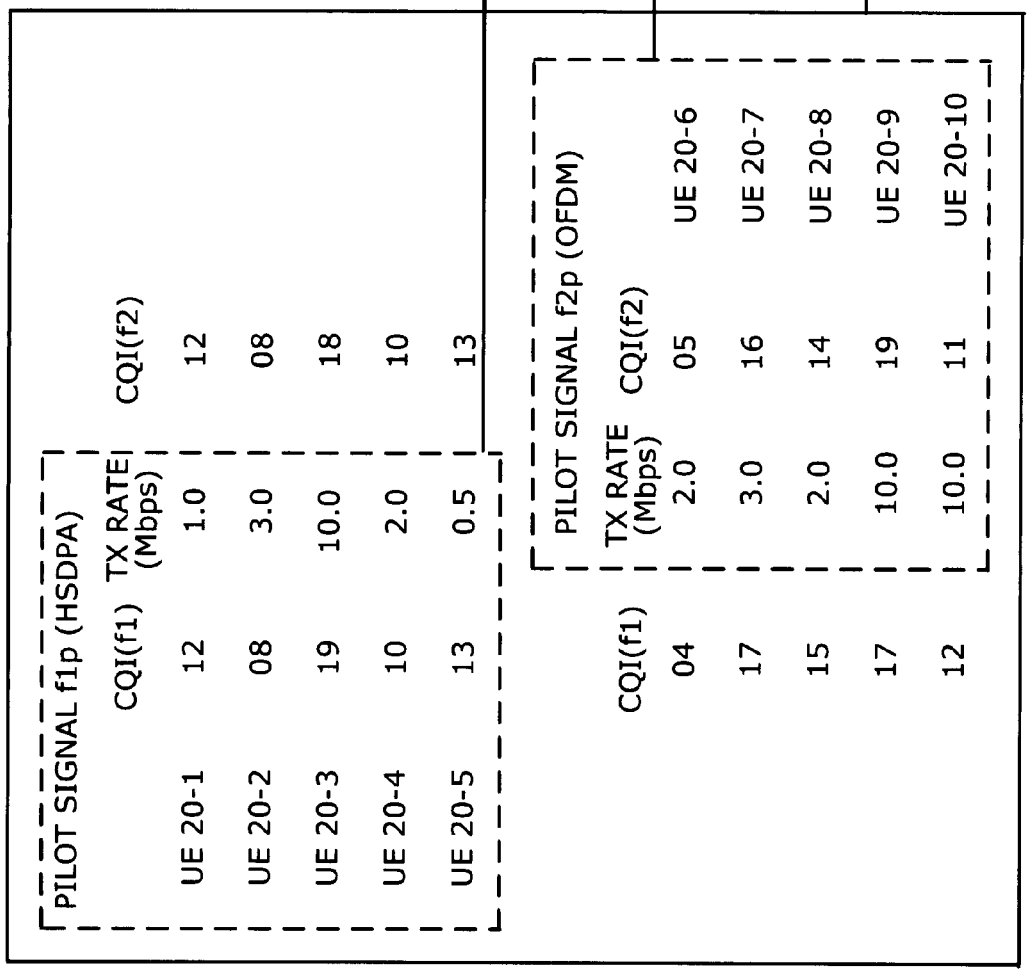
FIG. 4 shows scheduling models.

FIG. 4 shows scheduling models. This example assumes that the UEs 20-1 to 20-10 have returned their respective CQIs 12, 08, 19, 10, 13, 04, 17, 15, 17, and 12 in response to an HSDPA pilot signal f1$p$ with a carrier frequency f1.

It also assumes that the UEs 20-1 to 20-10 have returned their respective CQIs 12, 08, 18, 10, 13, 05, 16, 14, 19, and 11 in response to an OFDM pilot signal f2$p$ with a carrier frequency f2.

It further assumes that the transmission rates of UEs 20-1 to 20-10 in the downlink direction (i.e., from base station to UEs) are 1.0, 3.0, 10.0, 2.0, 0.5, 2.0, 3.0, 2.0, 10.0, and 10.0 Mbps, respectively. Note that the transmission rate of a UE is a function of the amount of transmit data, modulation method, and other parameters. Once the scheduling process selects a UE, its transmission rate will be determined accordingly. The exception is in the case of QoS-conscious scheduling (described later), in which the transmission rate may vary.

The scheduling in the present example uses the maximum C/I algorithm to select two UEs with high CQIs for each carrier frequency. That is, the scheduler selects two high-CQI UEs from the HSDPA group and another two high-CQI UEs from the OFDM group. Data transmission is supposed to proceed in descending order of CQI.

The selection of high-CQI UEs are, however, restricted by maximum transmission rates. Specifically, HSDPA can transmit at a maximum rate of 14.4 Mbps, as can OFDM at a maximum rate of 30.0 Mbps. The total transmission rate of selected UEs must not exceed the maximum transmission rate of each group.

FIG. 4 shows the conventional scheduling (indicated by the broken frames) along with a unified scheduling according to the present invention (indicated by the solid frame). The conventional scheduling involves HSDPA scheduling and OFDM scheduling as separate steps. The following section will first explain how this conventional scheduling works.

In HSDPA scheduling, the scheduler finds that the UE 20-3 has a CQI of 19, the highest of all UEs 20-1 to 20-5 currently using HSDPA service. This is followed by UE 20-5 with a CQI of 13. The total transmission rate of those two UEs 20-3 and 20-5 amounts to 10.5 Mbps, which satisfies the limitation of ≤14.4 Mbps.

In OFDM scheduling, the scheduler finds that the UE 20-9 has a CQI of 19, the highest of all UEs 20-6 to 20-10 currently using OFDM service. This is followed by UE 20-7 with a CQI of 16. The total transmission rate of those two UEs 20-9 and 20-6 amounts to 13.0 Mbps, which satisfies the limitation of ≤30.0 Mbps).

The conventional scheduling thus prioritizes the above UEs when providing communication services to UEs 20-1 to 20-10 in the cell 100d. Specifically, it gives a high priority to UEs 20-3 and 20-5 when providing HSDPA communication service, as well as to UEs 20-9 and 20-7 when providing OFDM communication service. The total transmission rate of HSDPA and OFDM in this case is 23.5 Mbps.

The following will now describe a unified scheduling according to the present invention, which schedules a plurality of different communication services in a collective manner. Specifically, the scheduler 15 (see FIG. 3) combines HSDPA scheduling and OFDM scheduling. The scheduling algorithm turns first to OFDM service (i.e., the service using a carrier frequency f2). In other words, the scheduling begins with a service having a higher maximum transmission rate.

The unified scheduling first discovers that, of all the UEs 20-1 to 20-10, the UE 20-9 has the highest CQI of 19 for OFDM, and that the UE 20-3 with a CQI of 18 ranks as the second. The total transmission rate of those two UEs 20-9 and 20-3 is 20.0 Mbps, which satisfies the limitation of ≤30.0 Mbps.

Then the remaining UEs are subjected to a scheduling for HSDPA service (i.e., the service using a carrier frequency f1). Specifically, the unified scheduling discovers that the UE 20-7 has the highest CQI of 17 for HSDPA, and that the UE 20-8 with a CQI of 15 ranks as the second. The total transmission rate of those two UEs 20-7 and 20-8 is 5.0 Mbps, which satisfies the limitation of ≤14.4 Mbps.

The unified scheduling thus prioritizes the above UEs when providing communication service to UEs 20-1 to 20-10 in the cell 100d. Specifically, it gives a high priority to UEs 20-9 and 20-3 when providing OFDM communication service, as well as to UEs 20-7 and 20-8 when providing HSDPA communication service. The total transmission rate of HSDPA and OFDM in this case amounts to 25.0 Mbps.

The result of the unified scheduling differs from that of the conventional scheduling in the following two points:

(1) The unified scheduling selects UE 20-8 instead of UE 20-5, unlike the conventional scheduling.

(2) The unified scheduling changes the carrier frequency of UE 20-3 from f1 to f2 (i.e., from HSDPA service to OFDM service).

Regarding the difference (1), UE 20-8 (OFDM) has a CQI of 14, which is higher than 13 of UE 20-5 (HSDPA) selected by the conventional scheduling.

While CQIs may vary from service to service, the maximum C/I method would select UEs based solely on their CQIs, regardless of the type of communication services. The scheduler of the present invention handles CQIs of a plurality of different communication services in a collective manner, which matches with the above-described policy of the maximum C/I method.

In general, UEs having a higher CQI are assigned a greater transmission rate. UEs having a smaller CQI are assigned a smaller transmission rate. (A high CQI means a good receive signal level, which justifies a higher transmission rate to transfer as much data as possible. Conversely, a low CQI means a poor receive signal level, which justifies a lower transmission rate to ensure the reliable transmission even though the amount of transmitted data may be limited.

Based on the above policy, the scheduling algorithm of the present invention selects UE 20-8 having a greater CQI than UE 20-5, thereby increasing the total transmission rate from 23.5 Mbps to 25 Mbps.

Regarding the difference (2), the unified scheduling causes the UE 20-3 to switch its communication from HSDPA to OFDM. This is a handover between different communications systems (called an "inter-system handover" or "inter-frequency handover").

With a conventional inter-frequency handover mechanism, an upper-level control station managing base stations is responsible for determining whether to perform a handover. According to the present invention, on the other hand, that decision is up to the scheduler 15 in each base station 10. In other words, it is not the control station, but the base station 10 that issues a handover request. This handover scheme greatly reduces the time required for controlling the process, thus enabling quick handover between different frequencies.

As the above example shows, the radio communications system 1 schedules collectively a plurality of different communication services by using a single scheduler 15. The proposed scheduling method increases the chance for UEs to win an allocation which may not be possible in the case of scheduling individual frequencies separately. The proposed method thus enhances the total transmission rate of the system.

The present invention also reduces unevenness of throughput (transmission rates) among different systems. It also makes quick inter-frequency handover possible, which requires extensive processing and thus has been a bottleneck in the development of a high-speed mobile communications system.

Figure 5:
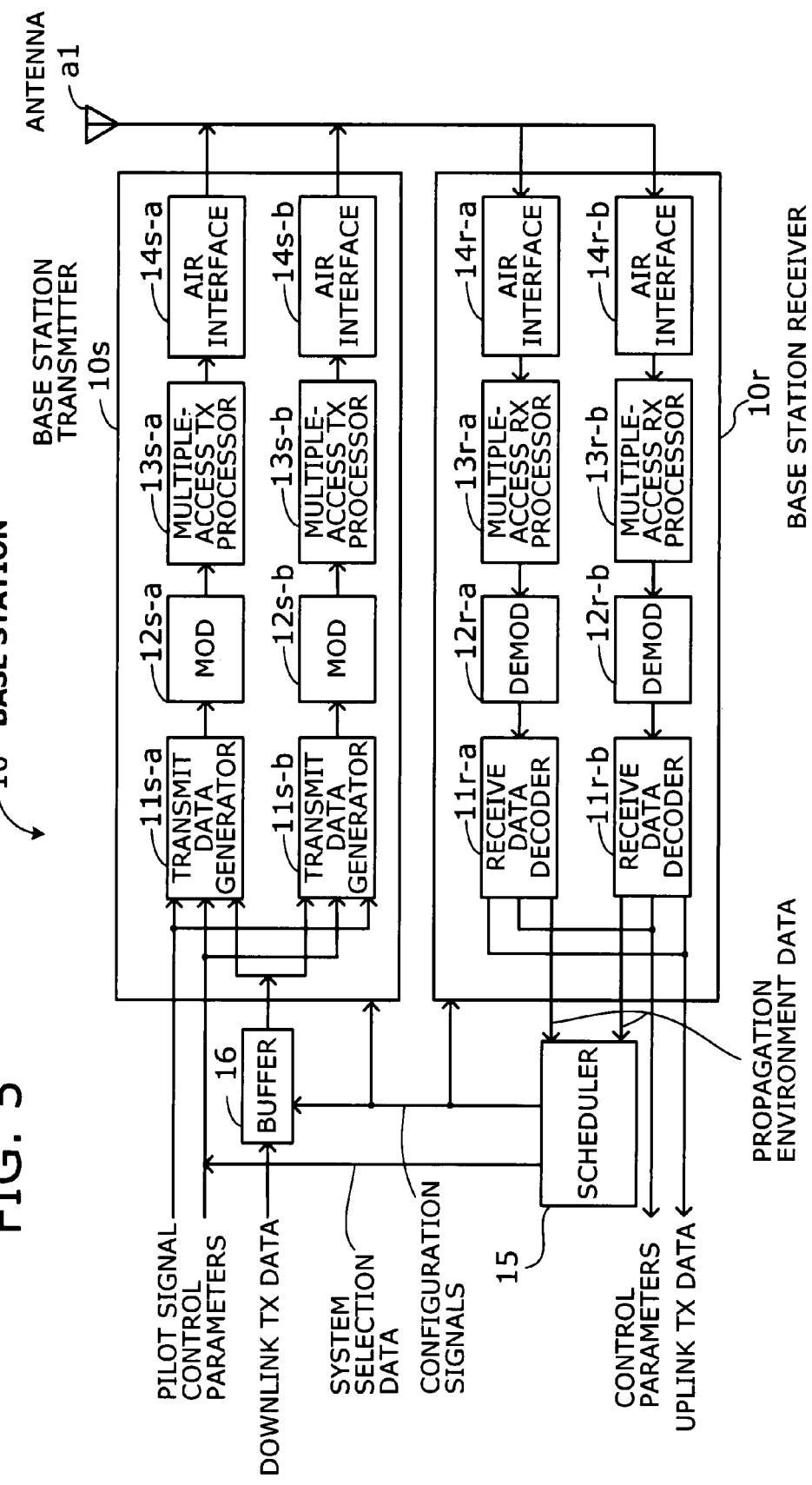
FIG. 5 shows a structure of a base station.

Referring now to FIG. 5, the next section will describe a structure of the base station 10. Specifically, FIG. 5 shows a base station structure that supports two different communication services A and B. The illustrated base station 10 is formed from a base station transmitter 10s, a base station receiver 10r, a scheduler 15, a buffer 16, and an antenna a1.

The base station transmitter 10s has two sets of data transmission functions to support communication services A and B. Specifically, the base station transmitter 10s includes the following elements: transmit data generators 11s-a and 11s-b, modulators (MOD) 12s-a and 12s-b, multiple-access transmission (TX) processors 13s-a and 13s-b, and air interfaces 14s-a and 14s-b. Note that the suffixes "a" and "b" of those reference numerals indicate that the elements provide transmit functions for communication services A and B, respectively.

The base station receiver 10r has two sets of data reception functions to support communication services A and B. Specifically, the base station receiver 10r includes the following elements: air interfaces 14r-a, 14r-b, multiple-access reception (RX) processors 13r-a, 13r-b, demodulators (DEMOD) 12r-a, 12r-b, and receive data decoders 11r-a, 11r-b. The suffixes "a" and "b" of those reference numerals indicate that the elements provide receive functions for communication services A and B, respectively. Suppose that the pilot signal sender 10a and control parameter sender 10b described earlier in FIG. 1 are included in the base station transmitter 10s.

Each element enumerated above operates as follows. Referring first to the transmit side, the transmit data generators 11s-a and 11s-b produce transmit data from at least one of pilot signals, control signals, and downlink transmission data. Note that control signals and downlink transmission data may not always be present. The modulators 12s-a and 12s-b subject the produced transmit data to a digital modulation process such as QAM.

The multiple-access transmission processors 13s-a and 13s-b process transmit signals according to the multiple access method used in each communication service. Multiple access techniques enable a plurality of users to share a single radio transmission channel to communicate simultaneously. For example, the multiple-access transmission processor 13s-a serves as a spreading processor in the case where the communication service A is W-CDMA (HSDPA). The air interfaces 14s-a and 14s-b convert the frequency of transmit signals produced by the multiple-access transmission processors 13s-a and 13s-b, thus sending out upconverted signals via the antenna a1.

Referring now to the receive side, the air interfaces 14r-a and 14r-b receive data signals from UEs via the antenna a1 and downconvert their frequencies, thereby outputting baseband signals. The multiple-access reception processors 13r-a and 13r-b process received signals according to the multiple access method used in each communication service. In the case where the communication service A actually is, for example, W-CDMA, the multiple-access reception processor 13r-a serves as a despreading processor.

The demodulators 12r-a and 12r-b demodulate signals supplied from the respective multiple-access reception processors 13r-a and 13r-b. The receive data decoders 11r-a and 11r-b decode the demodulated signals and correct errors if any, the output of which includes at least one of propagation environment data, control parameters, and uplink transmission data.

The scheduler 15 performs scheduling of communication services A and B, based on the received propagation environment data, thus determining communication priorities of UEs. The scheduler 15 outputs the result of this scheduling in the form of system selection data and configuration signals.

System selection data is supposed to be sent to the selected UEs, so that they will receive control parameters specifying the selected communication service, transmission data size, modulation method, and the like. Configuration signals are used inside the base station 10 in order to configure its own communication functions according to the outcome of the scheduling. Specifically, the scheduler 15 supplies configuration signals to the base station transmitter 10s and base station receiver 10r. The buffer 16 provides the transmit data generator 11s-a and 11s-b with as much downlink data as specified by the configuration signals.

Figure 6:
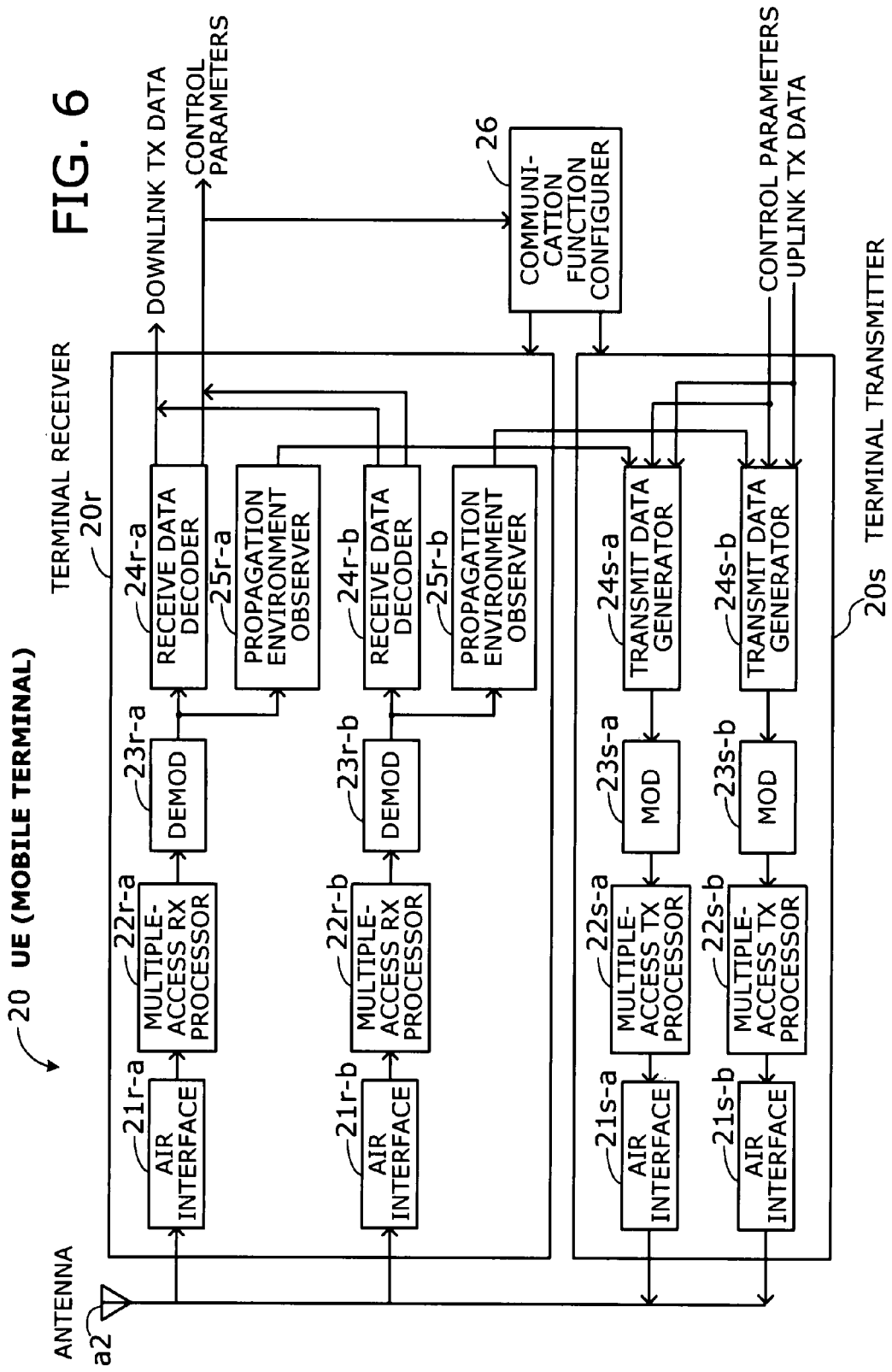
FIG. 6 shows a structure of a UE.

Referring to FIG. 6, the following section will describe the structure of UEs 20. FIG. 6 shows a terminal device structure that supports two different communication services A and B. Specifically, the illustrated UE 20 is formed from a terminal receiver 20r, a terminal transmitter 20s, a communication function configurer 26, and an antenna a2.

The terminal receiver 20r has two sets of data reception functions to support two communication services A and B. Specifically, the terminal receiver 20r includes the following elements: air interfaces 21r-a and 21r-b, multiple-access reception (RX) processors 22r-a and 22r-b, demodulators (DEMOD) 23r-a and 23r-b, receive data decoders 24r-a and 24r-b, and propagation environment observers 25r-a and 25r-b. The suffixes "a" and "b" of those reference numerals indicate that the elements provide receive functions for communication services A and B, respectively.

The terminal transmitter 20s has two sets of data transmission functions to support two types of communication services A and B. Specifically, the terminal transmitter 20s includes the following elements: transmit data generators 24s-a and 24s-b, modulators (MOD) 23s-a and 23s-b, multiple-access transmission (TX) processors 22s-a and 22s-b, and air interfaces 21s-a and 21s-b. The suffixes "a" and "b" of those reference numerals indicate that the elements provide transmit functions for communication services A and B, respectively.

Suppose that the propagation environment data sender 20a described earlier in FIG. 1 is included in the propagation environment observers 25r-a and 25r-b and terminal transmitter 20s. Also the QoS information sender 20b shown in FIG. 1 is now included in the terminal transmitter 20s.

Each element enumerated above operates as follows. Referring first to the receive side, the air interfaces 21r-a and 21r-b receive data signals from the base station 10 via the antenna a2 and downconvert their frequencies, thereby outputting baseband signals. The multiple-access reception processors 22r-a and 22r-b process the received signals according to the multiple access method used in each communication services. In the case where the communication service A is W-CDMA (HSDPA), for example, the multiple-access reception processor 22r-a serves as a despreading processor.

The demodulators 23r-a and 23r-b demodulate output signals of the multiple-access reception processors 22r-a and 22r-b, respectively. The receive data decoders 24r-a and 24r-b decode those demodulated signals and correct errors if any, the output of which includes at least one of propagation environment data, control parameters, and downlink transmission data. The propagation environment observers 25r-a and 25r-b observe output signals of the demodulators 23r-a and 23r-b to measure the current propagation environment, thus producing propagation environment data.

Referring next to the transmit side, the transmit data generators 24s-a and 24s-b produce transmit data from at least one of propagation environment data, control signals (including QoS information), and uplink transmission data. The modulators 23s-a and 23s-b subject the produced transmit data to a digital modulation process such as QAM.

The multiple-access transmission processor 22s-a and 22s-b process transmit signals according to the multiple access method used in each communication service. For example, the multiple-access transmission processor 22s-a serves as a spreading processor in the case where the communication service A is W-CDMA. The air interfaces 21s-a and 21s-b convert the frequency of transmit signals produced by the multiple-access transmission processors 22s-a and 22s-b, thus sending out upconverted signals via the antenna a2.

The communication function configurer 26 provides the terminal receiver 20r and terminal transmitter 20s with configuration signals, based on the control parameters received from the base station 10. Specifically, the configuration signals include information about the selected communication service, transmission data size, and modulation method.

Figure 7:
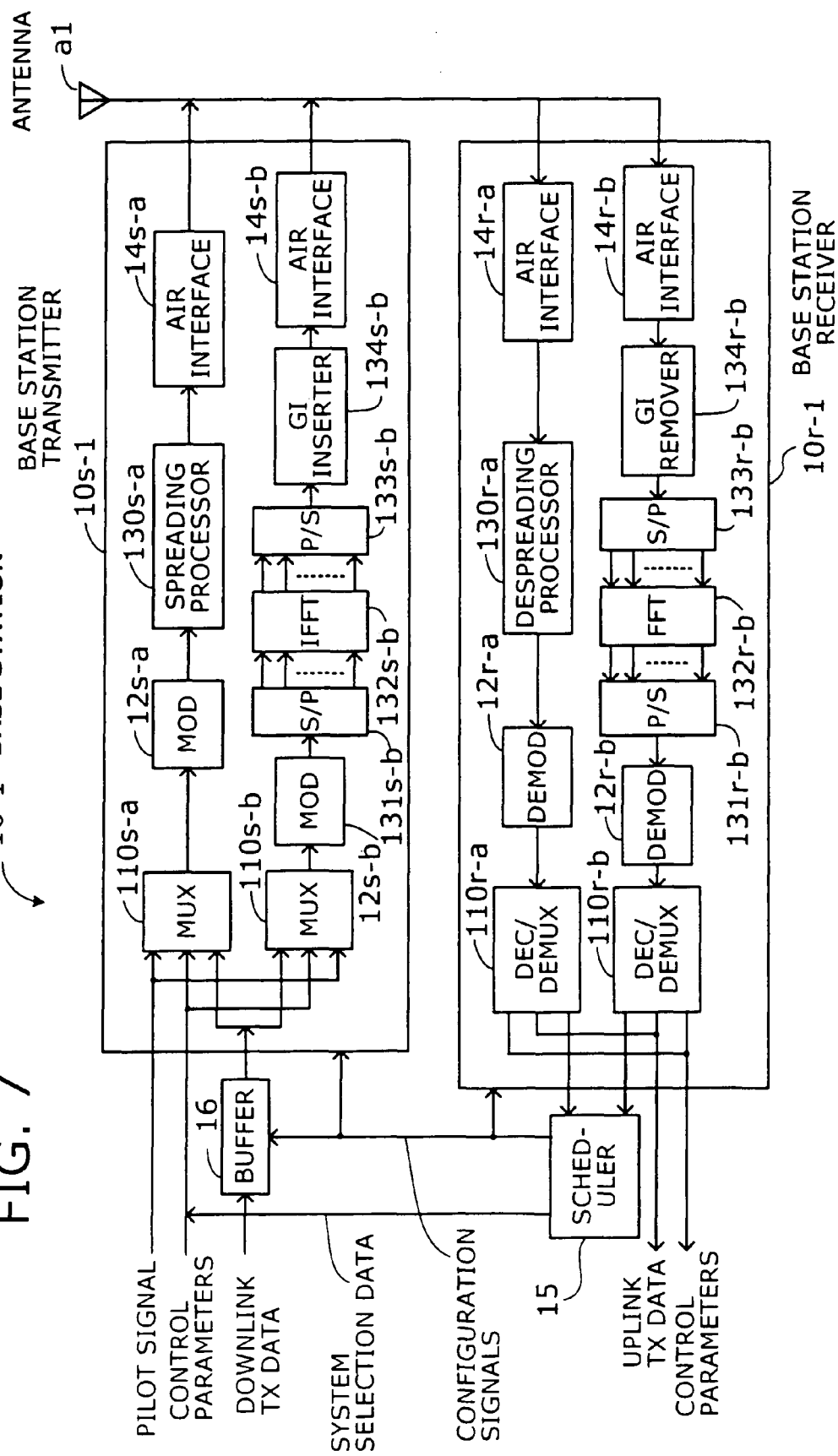
FIG. 7 shows a structure of a base station.

The following section will now present a specific configuration of the base station 10 and UE 20 in the case where W-CDMA (HSDPA) and OFDM services are provided as communication services A and B. FIG. 7 shows a structure of a base station. This base station 10-1 includes a base station transmitter 10s-1 and a base station receiver 10r-1 that support both HSDPA and OFDM communication services.

Some elements shown in FIG. 7 are different from what have been described earlier in FIG. 5. The differences are as follows: The transmit data generators 11s-a and 11s-b described in FIG. 5 are now implemented as multiplexers (MUX) 110s-a and 110s-b in FIG. 7. Also the receive data decoder 11r-a and 11r-b described in FIG. 5 are implemented as decoder/demultiplexers (DEC/DEMUX) 110r-a and 110r-b in FIG. 7.

Further, the multiple-access transmission processor 13s-a and multiple-access reception processor 13r-a used in HSDPA communication service are implemented as a spreading processor 130s-a and a despreading processor 130r-a, respectively. The spreading processor 130s-a produces a spread signal from a digital modulated signal by multiplying it by a spreading code. The produced signal has a wider frequency spectrum than the original signal. The despreading processor 130r-a uses the same spreading code to reproducing the original digital signal from a received spread signal.

To provide transmit functions for OFDM communication service, the multiple-access transmission processor 13s-b is implemented as a serial-to-parallel converter (S/P) 131s-b, an inverse fast Fourier transform (IFFT) 132s-b, a parallel-to-serial converter (P/S) 133s-b, and a guard interval (GI) inserter 134s-b.

The S/P 131s-b converts incoming symbols into parallel form, thus outputting several series of low-rate symbols, where the degree of parallelism equals the number of subcarriers. The IFFT 132s-b superimposes each series of low-rate symbols onto an OFDM carrier wave, thus achieving an inverse fast Fourier transform. This processing is actually an OFDM modulation. The P/S 133s-b converts the output signals of the IFFT 132s-b into a serial signal. The GI inserter 134s-b inserts a guard interval to each symbol period so as to eliminate inter-symbol interference at the receiving end. Guard interval (GI) is a redundant signal period, during which no symbols are present.

To provide receive functions for OFDM communication service, the multiple-access reception processor 13r-b is implemented as a GI remover 134r-b, an S/P 133r-b, a fast Fourier transform (FFT) 132r-b, and a P/S 131r-b.

The GI remover 134r-b removes GI from a received signal. The S/P 133r-b converts incoming symbols into parallel form, thus outputting several series of low-rate symbols. The FFT 132r-b subjects the resulting low-rate symbols to a fast Fourier transform process. This processing demodulates OFDM signals. The P/S 131r-b converts the output signals of the FFT 132r-b into a serial signal.

Figure 8:
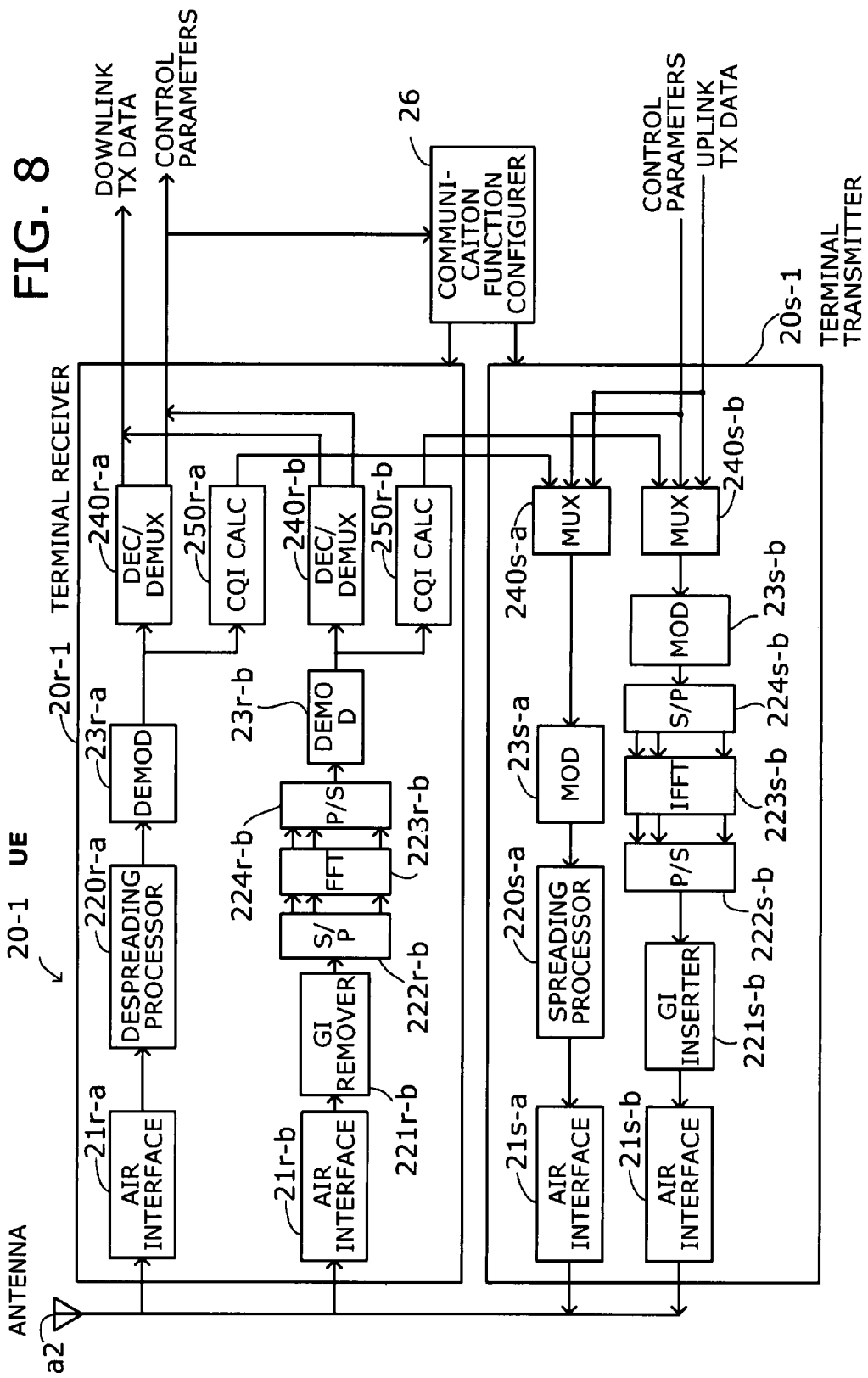
FIG. 8 shows another structure of a UE.

FIG. 8 shows the structure of a UE. This UE 20-1 is formed from a terminal transmitter 20s-1 and a terminal receiver 20r-1, which can operate selectively for either HSDPA or OFDM communication service.

Several elements shown in FIG. 8 are different from what have been described earlier in FIG. 6. The differences are as follows: The multiple-access reception processor 22r-a and multiple-access transmission processor 22s-a used in HSDPA communication service are now implemented as a despreading processor 220r-a and a spreading processor 220s-a, respectively. Also the receive data decoders 24r-a and 24r-b are implemented as decoder/demultiplexers (DEC/DE-MUX) 240r-a and 240r-b, respectively.

The propagation environment observers 25r-a and 25r-b are implemented as CQI calculators 250r-a and 250r-b. The CQI calculators 250r-a and 250r-b observe the respective output signals of the demodulators 23r-a and 23r-b and convert the measurements into CQIs.

To provide receive functions for OFDM communication service, the multiple-access reception processor 22r-b is implemented as a GI remover 221r-b, an S/P 222r-b, an FFT 223r-b, and a P/S 224r-b in FIG. 8. Also, to provide transmit functions for OFDM communication service, the multiple-access transmission processor 22s-b is implemented as an S/P 224s-b, an IFFT 223s-b, a P/S 222s-b, and a GI inserter 221s-b.

Figure 9:
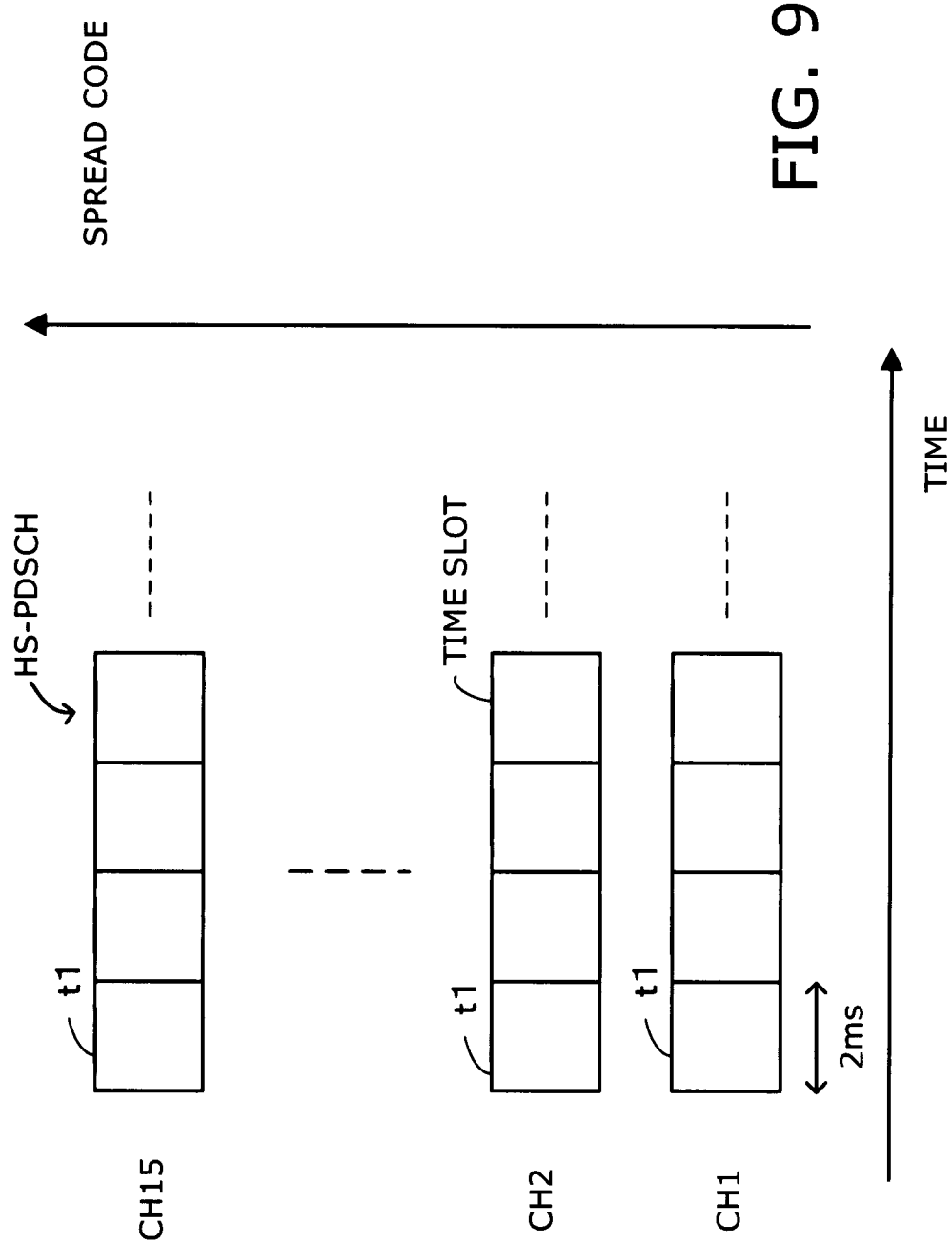
FIG. 9 shows how UEs are allocated on a radio channel.

The following section will describe in detail how the scheduler 15 assigns UEs to HSDPA service according to the unified scheduling algorithm. FIG. 9 shows how UEs are assigned to radio channels. The process of assigning UEs in HSDPA takes place on 2-ms timeslots of a radio channel carrying user data traffic, called "High-Speed Physical Downlink Shared Channel" (HS-PDSCH). Those timeslots are used by a single UE or shared by two or more UEs, as opposed to the Dedicated Physical Channel (DPCH) which uses individual radio channels to send downlink data to UEs.

Each cell has a plurality of HS-PDSCH channels. In the case of HSDPA, there are fifteen channels that can be distinguished by spread codes. For this reason, the downlink HS-PDSCH resources are allocated to UEs in both time domain and spread code domain.

Suppose, for example, that the scheduler has given a high priority to a UE. This UE may be allocated a time slot t1 of CH1, one of the fifteen HS-PDSCH channels, for delivery of data to the UE. Or the UE may be allocated a time slot t1 of all channels CH1 to CH15. It is a scheduler's task to determine how many and which time slots to use, as well as how many HS-PDSCH channels to use.

Figure 10:
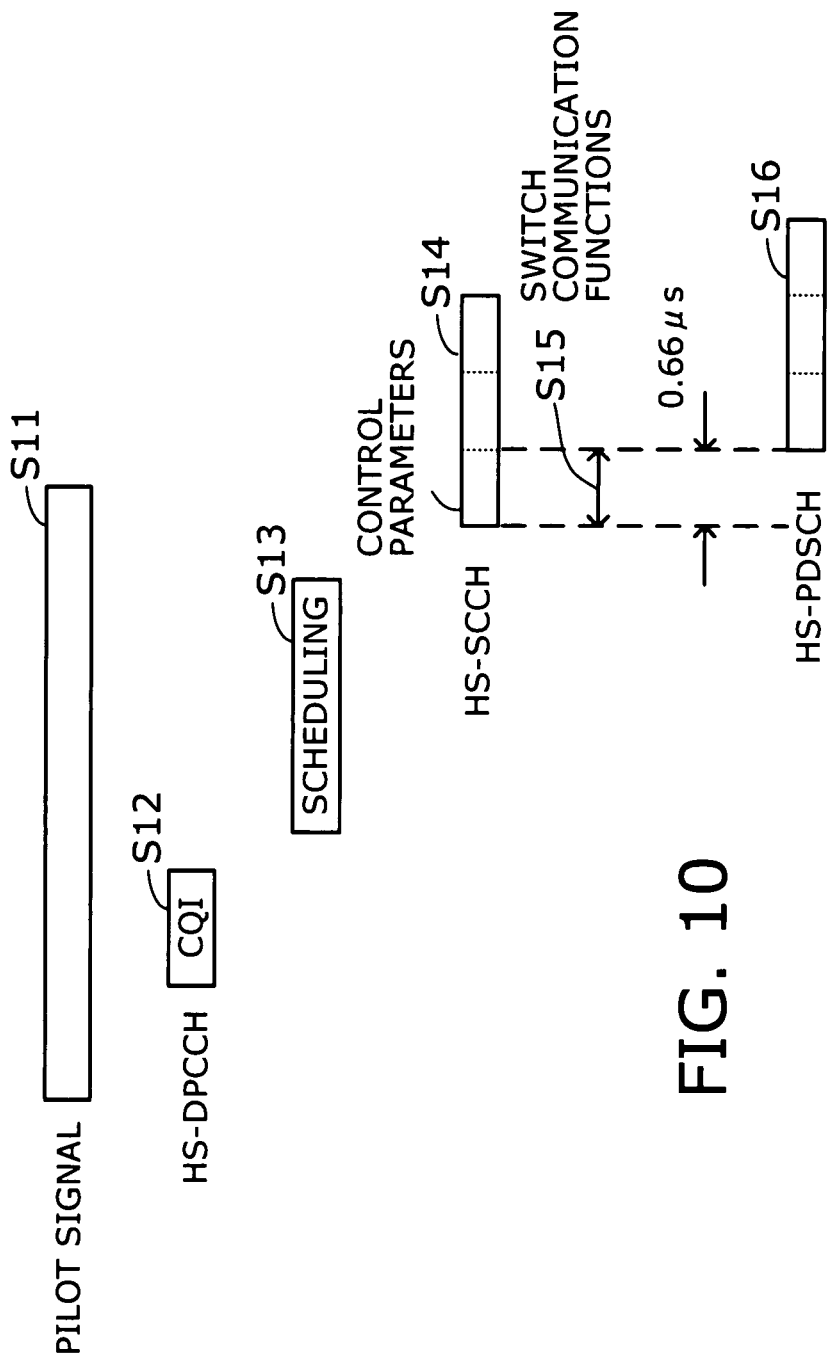
FIG. 10 shows a process flow from arrival of a pilot signal at UE to data transfer via a base station.

Referring next to FIG. 10, the following section will describe a process flow of data transmission, which begins with reception of pilot signals at UEs 20-1 to 20-n and proceeds to a subsequent scheduling process at the base station 10.

(S11) The base station 10 sends out a pilot signal.

(S12) Upon receipt of the pilot signal, each UE 20-1 to 20-n calculates CQI and sends it back to the base station 10. To deliver the CQI information to the base station 10, the UEs 20-1 to 20-n use a radio channel called "High-Speed Dedicated Physical Control Channel" (HS-DPCCH).

(S13) The base station 10 performs a unified scheduling based on the received CQIs.

(S14) The base station 10 transmits control parameters, the result of the scheduling, to selected UEs. To deliver those control parameters to UEs 20, the base station 10 uses 2-ms time slots of a radio channel called "High-Speed Shared Control Channel" (HS-SCCH).

(S15) Based on the received control parameters, the UEs 20 configure their communication functions.

(S16) The base station 10 sends data to the UEs 20 using the communication service that the scheduling process has determined. This data is delivered to the UEs 20 by the HS-PDSCH channels described earlier in FIG. 9.

Since the UEs 20 need time to configure their communication functions after receiving control parameters, the base station 10 is designed to start sending data with a specific delay, such that the data will arrive at UEs 20 after they are ready to receive. More specifically, a fixed time space is defined between HS-SCCH transmission and HS-PDSCH transmission. This is referred to as a "Transmission Time Interval" (TTI).

Figure 11:
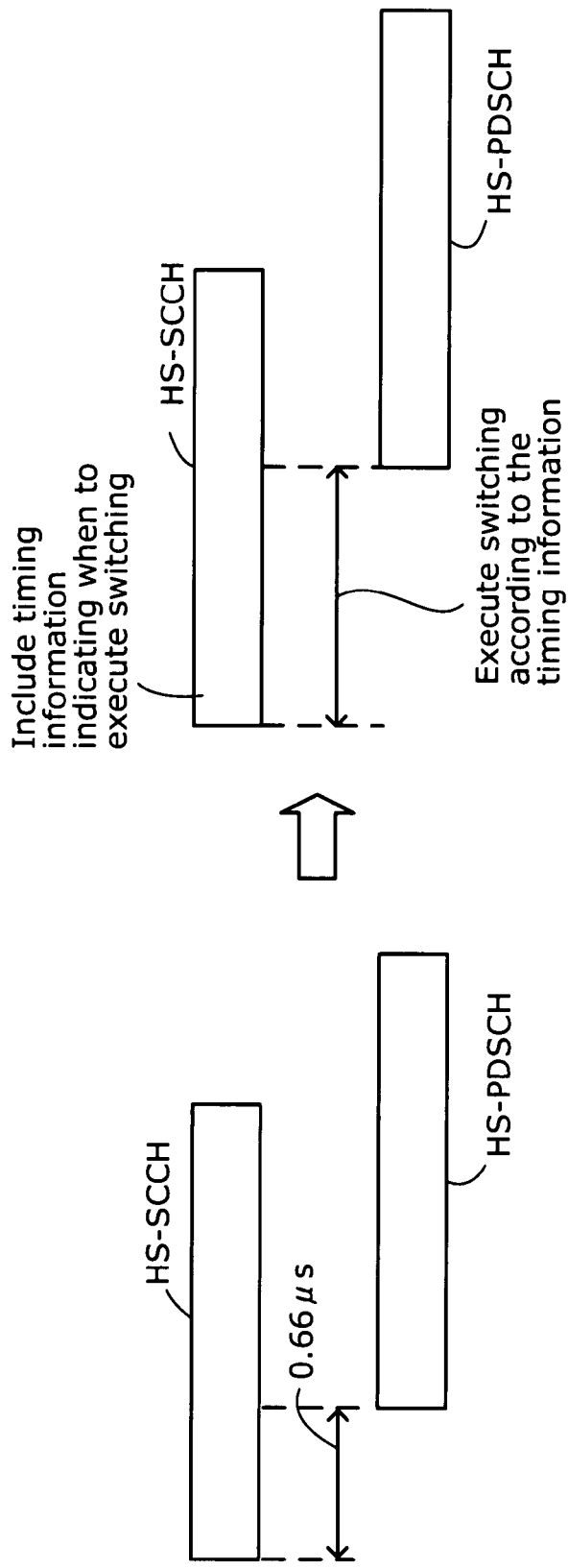
FIG. 11 shows TTI.

FIG. 11 depicts TTI. The conventional HSDPA scheduling specifies which modulation method to use (e.g., QPSK or 16QAM) and how much data to send each time (referred to as TBS, or "transport block size"), as part of control parameters. UEs are designed to configure their communication functions based on the specified parameters. TTI is set to 0.66 μs, one third of the time slot interval (2 ms). This delay time length is sufficient for UEs to configure themselves since what they have to change is mostly limited to modulation methods.

In contrast, the scheduling according to the present invention requires UEs 20 to switch between different communication services (e.g., from HSDPA to OFDM), which is a substantial change to their internal system. This leads to a fear that the conventional TTI might not be long enough for UEs to finish reconfiguring communication functions.

To address the above problem, the base station 10 includes in the control parameters a piece of information indicating when the base station 10 will switch communication services, modulation methods, transmit data sizes, and the like. This timing information gives UEs 20 enough time to complete their respective configuration tasks operation, so that the UEs 20 will be ready by the time the selected communication service comes into operation. The UEs 20 receive such timing information together with control parameters, thus being able to know beforehand when the base station 10 will change services. The UEs 20 set up their communication functions for the selected service, not to be late for the change at the base station.

The following section will describe a unified scheduling with consideration given to QoS. Specifically, the scheduler 15 may receive optional QoS information from UEs as part of their control parameters, together with propagation environment data. If this is the case, the scheduler 15 takes the received QoS information into consideration when it determines priority of UEs.

QoS properties include a required transmission rate, which refers to a minimum transmission rate that the system is supposed to guarantee. For example, delivery of video data requires a minimum guaranteed rate in order to avoid jerkiness of moving pictures and prevent quality degradation at the receiving end. When selecting a high-CQI UE, the scheduler 15 thus has to satisfy the required transmission rate that it specifies as QoS information.

More specifically, the scheduler 15 operates as follows. FIG. 12 shows a scheduling model. It is assumed that UEs 20-1 to 20-10 have returned their respective CQIs 12, 08, 19, 10, 13, 04, 17, 15, 19, and 12 in response to an HSDPA pilot signal f1p.

It is also assumed that the UEs 20-1 to 20-10 have returned their respective CQIs 12, 08, 20, 10, 13, 05, 16, 14, 19, and 11 in response to an OFDM pilot signal f2p.

It is further assumed that the UEs 20-1 to 20-10 specify their respective required transmission rates of 1.0, 3.0, 10.0, 2.0, 0.5, 2.0, 8.0, 6.0, 15.0, and 10.0 (Mbps) in the downlink direction (i.e., base station to UE). The term "required transmission rate" means a minimum transmission rate that has to be guaranteed, as opposed to the transmission rates shown in FIG. 4.

The scheduling algorithm in the present example uses a maximum C/I method to select two UEs with high CQIs for each particular frequency. That is, the scheduler selects two high-CQI UEs for HSDPA and another two high-CQI UEs for OFDM, and the data transmission starts with the terminal having the highest CQI. The selection of high-CQI UEs are, however, restricted by the maximum transmission rates. Specifically, HSDPA can transmit at a maximum rate of 14.4 Mbps, as can OFDM at a maximum rate of 30.0 Mbps. The total transmission rate of selected UEs must not exceed the maximum transmission rate of each service.

The scheduling process discovers that the UE 20-3 has a CQI of 20, the highest of all UEs 20-1 to 20-10, and that the UE 20-9 with a CQI of 19 ranks as the second. The total transmission rate of those two UEs 20-3 and 20-9 is 25.0 Mbps, which satisfies the limitation of ≤30.0 Mbps.

Then the remaining UEs are subjected to a scheduling for HSDPA service. Specifically, the scheduling process discovers that the UE 20-7 has the highest CQI of 17 for HSDPA, and that the UE 20-8 with a CQI of 15 ranks as the second. The total transmission rate of those two UEs 20-7 and 20-8 is 14.0 Mbps, which satisfies the limitation of ≤14.4 Mbps.

The scheduling process thus prioritizes the above UEs when providing communication services to UEs 20-1 to 20-10. Specifically, it gives a high priority to UEs 20-3 and 20-9 in HSDPA communication service, as well as to UEs 20-7 and 20-8 in OFDM communication service. The total transmission rate of HSDPA and OFDM in this case amounts to 39.0 Mbps.

It has to be noted that the required transmission rate of the UE 20-9 is 15.0 Mbps, meaning that the transmission rate has to be at least 15.0 Mbps. The HSDPA communication service, however, is unable to serve the UE 20-9 in spite of its high CQI, since the required rate is greater than 14.4 Mbps, the maximum transmission rate of HSDPA.

OFDM, on the other hand, offers a maximum transmission rate of 30.0 Mbps, thus being capable of serving the UE 20-9. Because QoS has to be considered, OFDM is the only option for the UE 20-9 in this case, unlike the scheduling described earlier in FIG. 4.

As the above example shows, the QoS-conscious unified scheduling selects UEs that not only have a high CQI, but also satisfy a required transmission rate. This type of scheduling guarantees a specified minimum transmission rate (required transmission rate). In other words, the actual transmission rate can exceed the required transmission rate. Without consideration of QoS, the transmission rates shown in FIG. 4 are maximum transmission rates of corresponding communication services. For example, FIG. 4 shows that the UE 20-9 has a transmission rate of 10.0 Mbps, meaning that the UE 20-9 may receive downlink data at a rate lower than 10.0 Mbps.

The QoS-conscious unified scheduling also supports inter-frequency handover illustrated in FIG. 4. Referring to the example of FIG. 12, the UE 20-3 undergoes an inter-frequency handover to switch its communication service from HSDPA(f1) to OFDM(f2).

The above-described scheduling algorithm takes a required transmission rate into consideration as a QoS property. This QoS-conscious scheduling not only enhances the transmission rate of the entire system, but also guarantees a minimum transmission rate in the service. While the foregoing example considers required transmission rates as a QoS property, the scheduling process may take other property into consideration.

The following section will now describe how the scheduler determines transmission rates according to CQI values, as well as how it determines a transport block size (TBS) and modulation method according to a required transmission rate specified as QoS.

The non-QoS-conscious unified scheduling determines transmission rates directly from CQIs reported by UEs 20. Specifically, CQIs affect such parameters as the number of HS-PDSCH channels, TBS (in bits), and modulation types.

The scheduler has a set of predetermined patterns of those parameters corresponding to each CQI value. For example, if CQI is 1, then one HS-PDSCH channel is allocated, TBS is set to 137 bits, and QPSK is used for modulation. If CQI is 2, then one HS-PDSCH channel is allocated, TBS is set to 173 bits, and QPSK is used for modulation.

In this way, the non-QoS-conscious scheduling uses such fixed parameters corresponding to CQIs, thus determining a transmission rate directly from a given CQI. Particularly, TBS plays a primary role in determining transmission rates.

On the other hand, the QoS-conscious unified scheduling has to guarantee a minimum transmission rate specified as a required transmission rate. To this end, the scheduler varies TBS and modulation type parameters depending on CQIs, so as to realize the required transmission rate.

As a second embodiment of the invention, another type of unified scheduling algorithm will now be described below. According to the second embodiment, a plurality of pilot signals with different carrier frequencies are transmitted to perform a unified scheduling for a single communication service.

In the first embodiment, the base station 10 sends a pilot signal with a particular carrier frequency corresponding to each of a plurality of different communication services. For example, it sends a pilot signal f1p with a carrier frequency f1 for HSDPA and pilot signal f2p with a carrier frequency f2 for OFDM). The second embodiment differs from the first embodiment in that the base station 10 sends two pilot signals f3p and f4p with different carrier frequencies f3 and f4 for a single communication service, HSDPA, for example.

The second embodiment also differs from the first embodiment in that it supports a single multiple access system for transmission and reception, unlike the first embodiment which handles different multiple access systems for different communication services. In the case of HSDPA, for example, the second embodiment provides spreading and despreading functions for multiple access. Other fundamental structure of the system and its constituent devices is basically the same as the first embodiment. The following description will thus focus on how the second embodiment operates.

Figure 13:
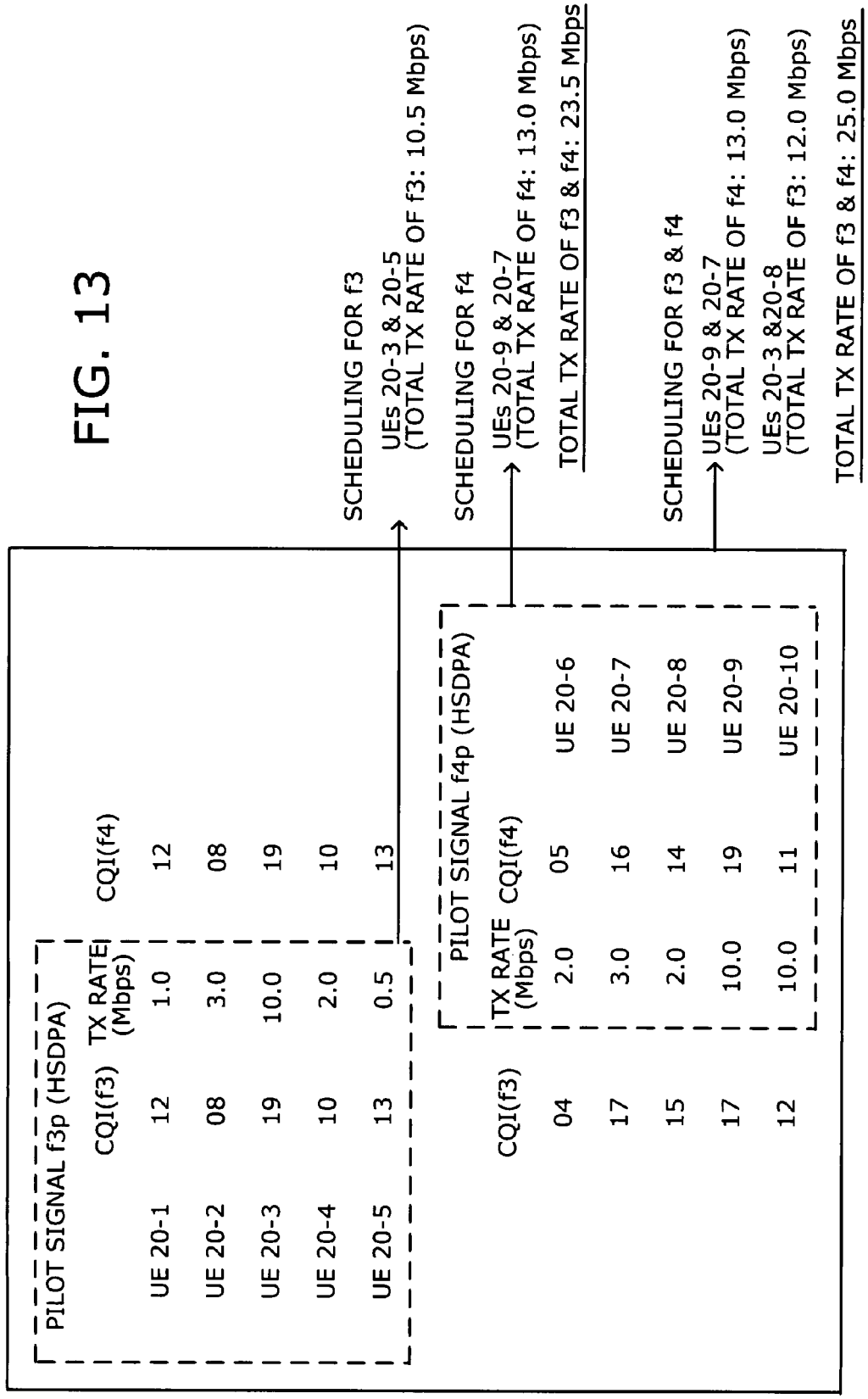
FIG. 13 shows another scheduling model.

FIG. 13 shows a scheduling model. This example assumes that UEs 20-1 to 20-10 have returned their respective CQIs 12, 08, 19, 10, 13, 04, 17, 15, 17, and 12 in response to an HSDPA pilot signal f3p with a carrier frequency f3.

It also assumes that the UEs 20-1 to 20-10 have returned their respective CQIs 12, 08, 19, 10, 13, 05, 16, 14, 19, and 11 in response to another HSDPA pilot signal f4p with a carrier frequency f4.

It further assumes that the UEs 20-1 to 20-10 have transmission rates of 1.0, 3.0, 10.0, 2.0, 0.5, 2.0, 3.0, 2.0, 10.0, and 10.0 (Mbps) in the downlink direction (i.e., from base station to UEs).

The scheduling algorithm uses a maximum C/1 method to select two UEs with high CQIs for each particular carrier frequency. That is, the scheduler selects two UEs exhibiting a high CQI for one carrier frequency f3 and another two UEs exhibiting a high CQI for the other carrier frequency f4. Data transmission is supposed to start with the terminal device with the highest CQI. The selection of high-CQI UEs are, however, restricted by the maximum transmission rate, 14.4 Mbps, of HSDPA. The total transmission rate of the selected UEs must not exceed this limit.

The conventional scheduling selects UEs separately for the two carrier frequencies f3 and f4 as follows. First, in HSDPA scheduling for f3, the scheduler finds that the UE 20-3 has a CQI of 19, the highest of all UEs 20-1 to 20-5 currently using HSDPA service at the carrier frequency f3. This is followed by UE 20-5 with a CQI of 13. The total transmission rate of those two UEs 20-3 and 20-5 is 10.5 Mbps, which satisfies the limitation of ≤14.4 Mbps.

Then, in HSDPA scheduling for f4, the scheduler finds that the UE 20-9 has a CQI of 19, the highest of all UEs 20-6 to 20-10 currently using HSDPA service at the carrier frequency f4. This is followed by UE 20-7 with a CQI of 16. The total transmission rate of those two UEs 20-9 and 20-7 is 13.0 Mbps, which satisfies the limitation of ≤14.4 Mbps.

The conventional scheduling thus prioritizes the above UEs when providing communication service to UEs 20-1 to 20-10. Specifically, a high priority is given to UEs 20-3 and 20-5 for HSDPA communication service at one carrier frequency f3, as well as to UEs 20-9 and 20-7 for HSDPA communication service at the other carrier frequency f4. The total HSDPA transmission rate of those two carrier frequency f3 and FIG. 4 amounts to 23.5 Mbps.

The unified scheduling algorithm handles multiple carries frequencies collectively. The algorithm is designed to process the carrier frequency f4 first and then proceed to the other carrier frequency f3. (In the present case, the scheduling may begin with f3 and then proceed to f4 since they have the same maximum transmission rates.) In addition to the above, the scheduling algorithm is supposed to select the currently used carrier frequency if there is no difference (or no significant difference) in terms of CQI values.

The scheduler first finds that two UEs 20-3 and 20-9 have a CQI of 19, the highest of all UEs 20-1 to 20-10, for the carrier frequency f4. Their total transmission rate, however, amounts to 20.0 Mbps, exceeding the limit of 14.4 Mbps.

In this case, the scheduler applies the rule of current frequency first, thus choosing the UE 20-9 currently using f4. That is, selecting the UE 20-3 would bring about a handover from f3 to f4 since that UE has been using f3 for HSDPA communication. The scheduler thus selects the other UE 20-9 necessitating no handover.

The above example assumes that the two UEs have the same CQI, but there may be a case where they have different but close CQIs. For example, one UE 20-3 may have a CQI of 19 while the other UE 20-9 has a CQI of 18. In such a case, the scheduler is allowed to select the latter UE 20-9.

After selecting the UE 20-9, the scheduler continues the scheduling for the carrier frequency f4, thus selecting another UE 20-7 with a CQI of 16. The total transmission rate amounts to 13.0 Mbps, which satisfies the limitation of 14.4 Mbps.

Now that UEs 20-9 and 20-7 are selected, the remaining UEs are then subjected to a scheduling process for another carrier frequency f3. The scheduler finds that the UE 20-3 has a highest CQI of 19, followed by the UE 20-8 with a CQI of 15. Their total transmission rate is 12.0 Mbps, which satisfies the limitation of 14.4 Mbps.

The scheduler thus prioritizes the above UEs when providing communication service to UEs 20-1 to 20-10. Specifically, a high priority is given to UEs 20-9 and 20-7 for HSDPA communication service at one carrier frequency f3, as well as to UEs 20-3 and 20-8 for HSDPA communication service at the other carrier frequency f4. The total transmission rate of f3 and f4 amounts to 25.0 Mbps, which is higher than the result of the conventional scheduling.

The following section will now describe a third embodiment of the invention. The foregoing first and second embodiments are designed such that UEs return a CQI representing their measured propagation environment by using different uplink frequencies corresponding to pilot signals that they have received.

Referring back to FIG. 3, for example, UEs send uplink signals f1u to inform the base station 10 of their CQI measurement result in response to a pilot signal f1p. Likewise, they send uplink signals f2u to inform the base station 10 of their CQI measurement result in response to a pilot signal f2p, where f1u and f2u are different in frequency.

The third embodiment, on the other hand, UEs use a single particular frequency to carry all CQIs measured with respect to N pilot signals with different carrier frequencies. For example, UEs send two CQIs corresponding to two pilot signals f1p and f2p back to the base station 10 by using an uplink channel with a particular frequency.

Therefore the base station 10 has only to watch a single frequency to receive uplink signals from UEs. The base station 10, however, needs to know from which pilot signal (or which carrier frequency) the received CQIs are derived. To this end, the responding UEs 20 encode their CQI, their status, and the like.

Figure 14:
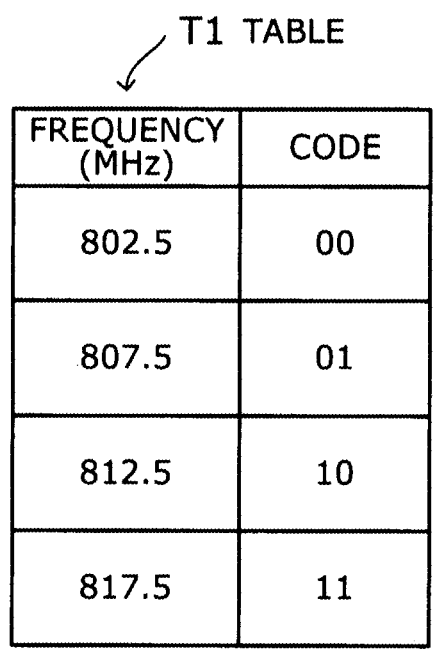
FIG. 14 shows a code table.
Figure 15:
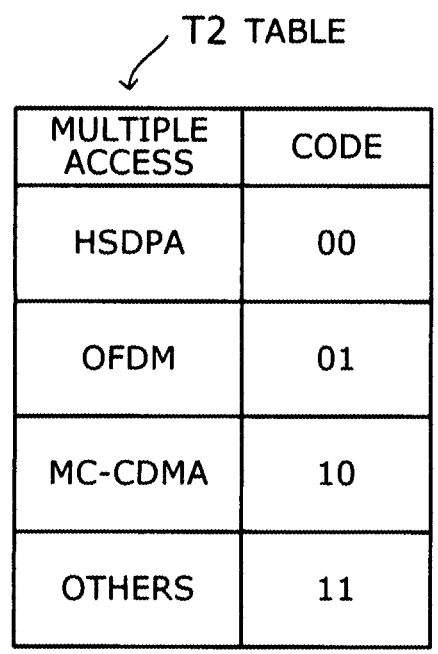
FIG. 15 shows another code table.
Figure 16:
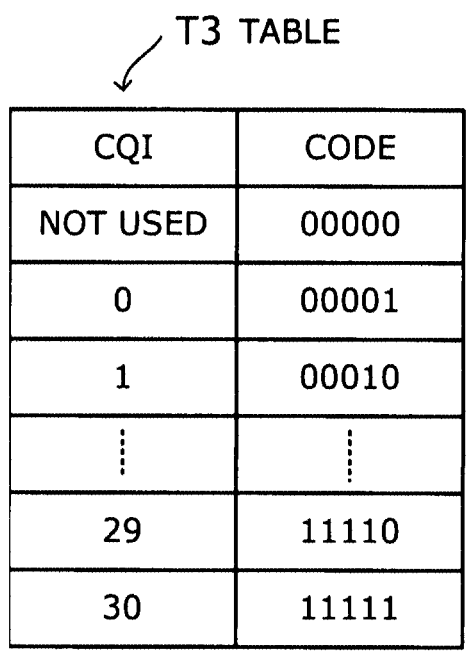
FIG. 16 shows yet another code table.

FIGS. 14 to 16 show code tables. Referring first to FIG. 14, the carrier frequency of each pilot signal is defined in a table T1. Each signal has a bandwidth of 5.0 MHz, and the pilot signals thus use a frequency range of 800 MHz to 820 MHz. For example, the pilot signal of 802.5 MHz is represented by a code of "00."

Referring to FIG. 15, the multiple access system currently used by UEs 20 is represented by a code shown in a table T2. For example, MC-CDMA multiple access is coded as "10." Referring to FIG. 16, CQI that each UE 20 observes is represented by a code according to a table T3, where the codes correspond to CQI values ranging from 0 to 30. For example, a code "11110" represents a CQI value of 29. UEs concatenate the codes of carrier frequency, multiple access system, and CQI in that order.

Suppose now that a UE 20 using HSDPA service has calculated a CQI of 29 with respect to a pilot signal of 802.5 MHz. In this case, the tables T1 to T3 give three codes "00" (802.5 MHz), "00" (HSDPA), and "11110" (CQI), which are concatenated into "000011110."

For another example, suppose that a UE 20 using OFDM service has calculated a CQI of 30 with respect to a pilot signal of 807.5 MHz. In this case, the tables T1 to T3 give three codes "01" (807.5 MHz), "01" (OFDM), and "11111" (CQI), which are concatenated into "010111111."

The base station 10 receives "0000111100101111111" ("000011110"+"0101111111"). This code may be accompanied by an error correction code.

As can be seen from the above, UEs according to the third embodiment produce a code to represent their CQI and other information and delivers it to the base station 10 by using an uplink signal with a single frequency. The base station receives such uplink signals with a particular frequency, thus collecting propagation environment data. The third embodiment reduces the number of radio channels to transport propagation environment data, thus making efficient use of channel resources.

The following section will now describe a fourth embodiment of the invention. Recall that, in the first embodiment, a single base station supports both HSDPA and OFDM services using different carrier frequencies. In contrast, the fourth embodiment provides a plurality of communication services (e.g., HSDPA and OFDM) using a common carrier frequency. The fundamental structure of the system and its constituent devices is basically the same as those shown in FIGS. 5 and 6. The following description will thus focus on how the fourth embodiment operates.

Figure 17:
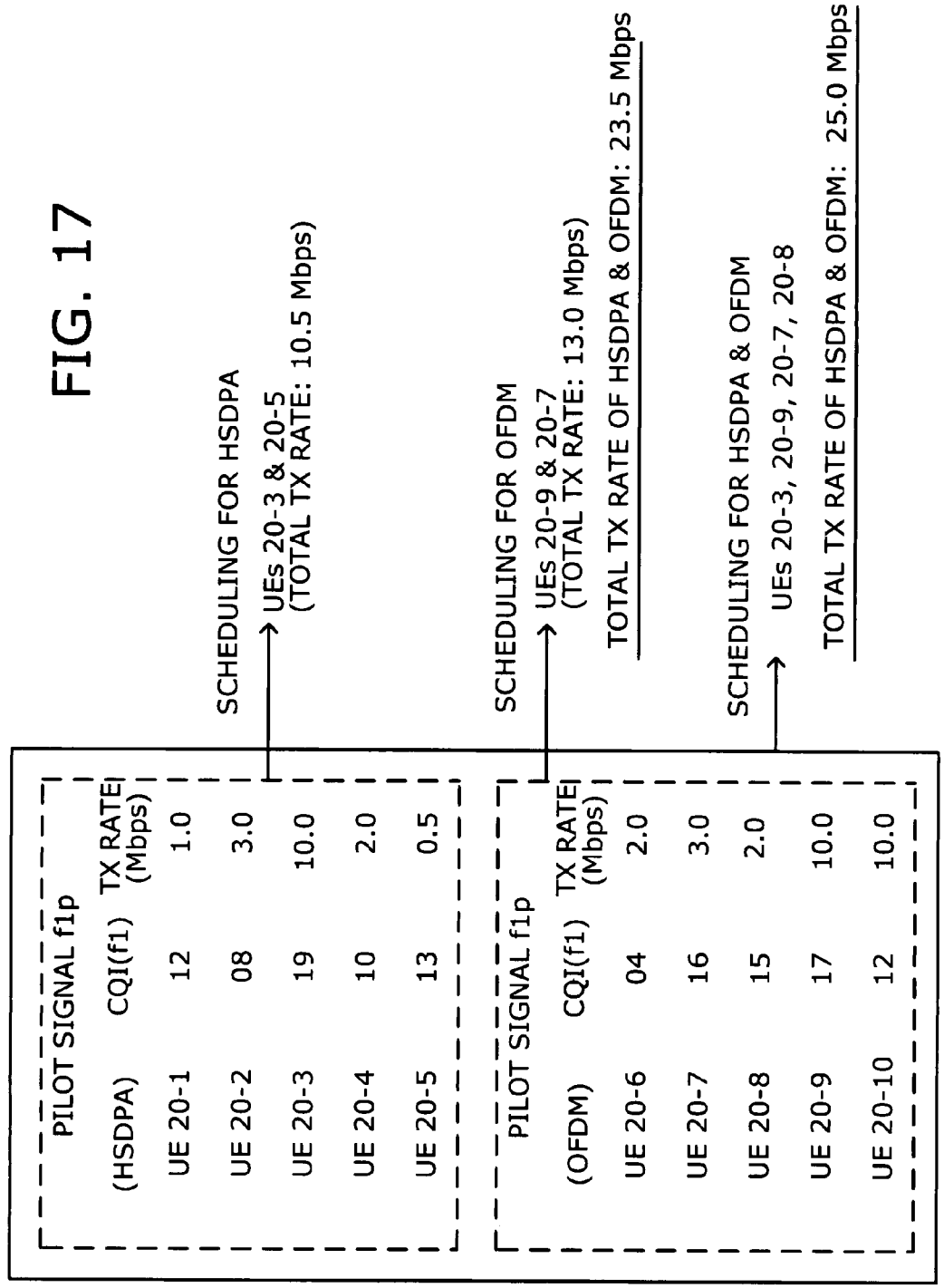
FIG. 17 shows still another scheduling model.
Figure 18:
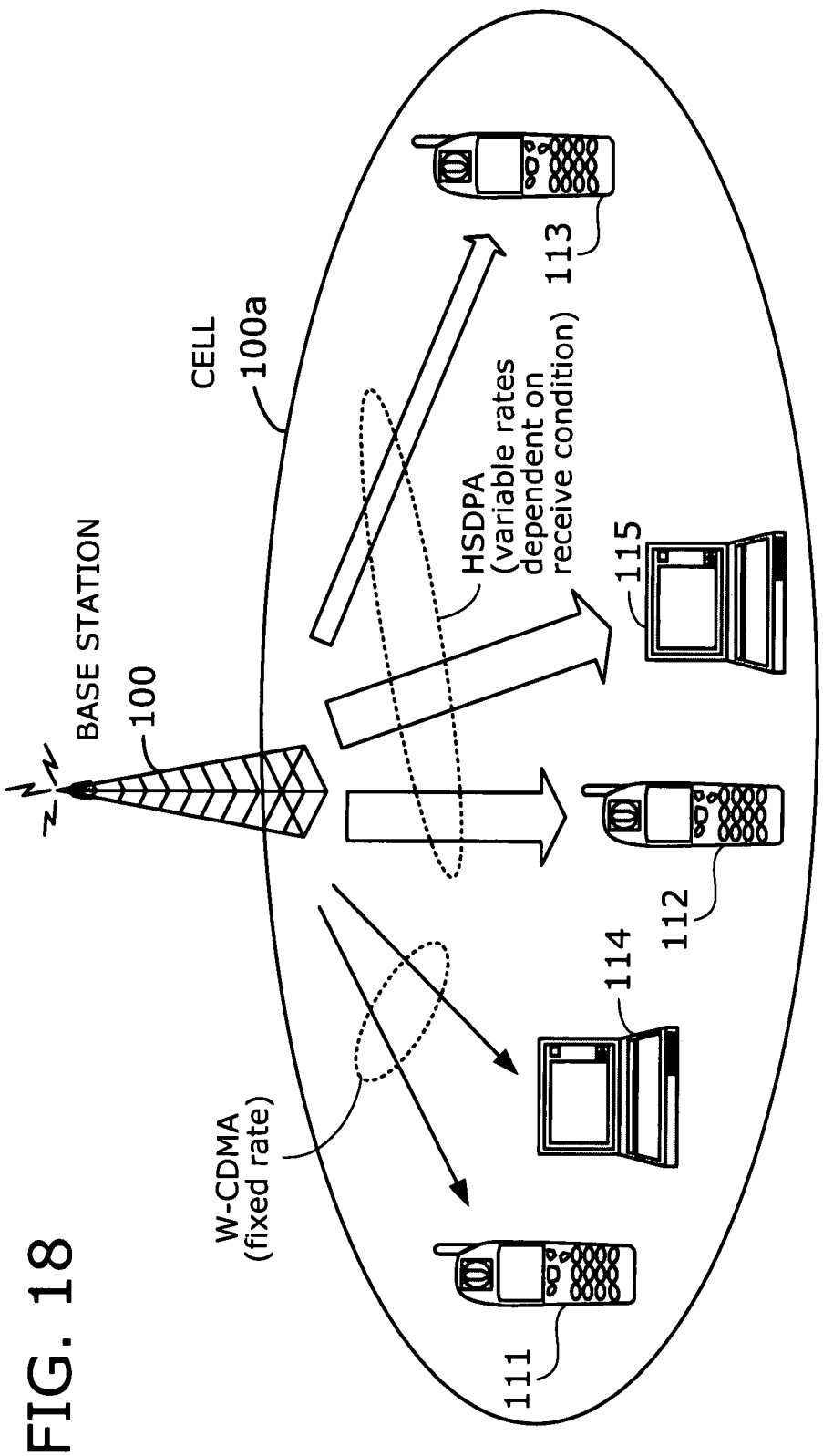
FIG. 18 gives an overview of a HSDPA.
Figure 19:
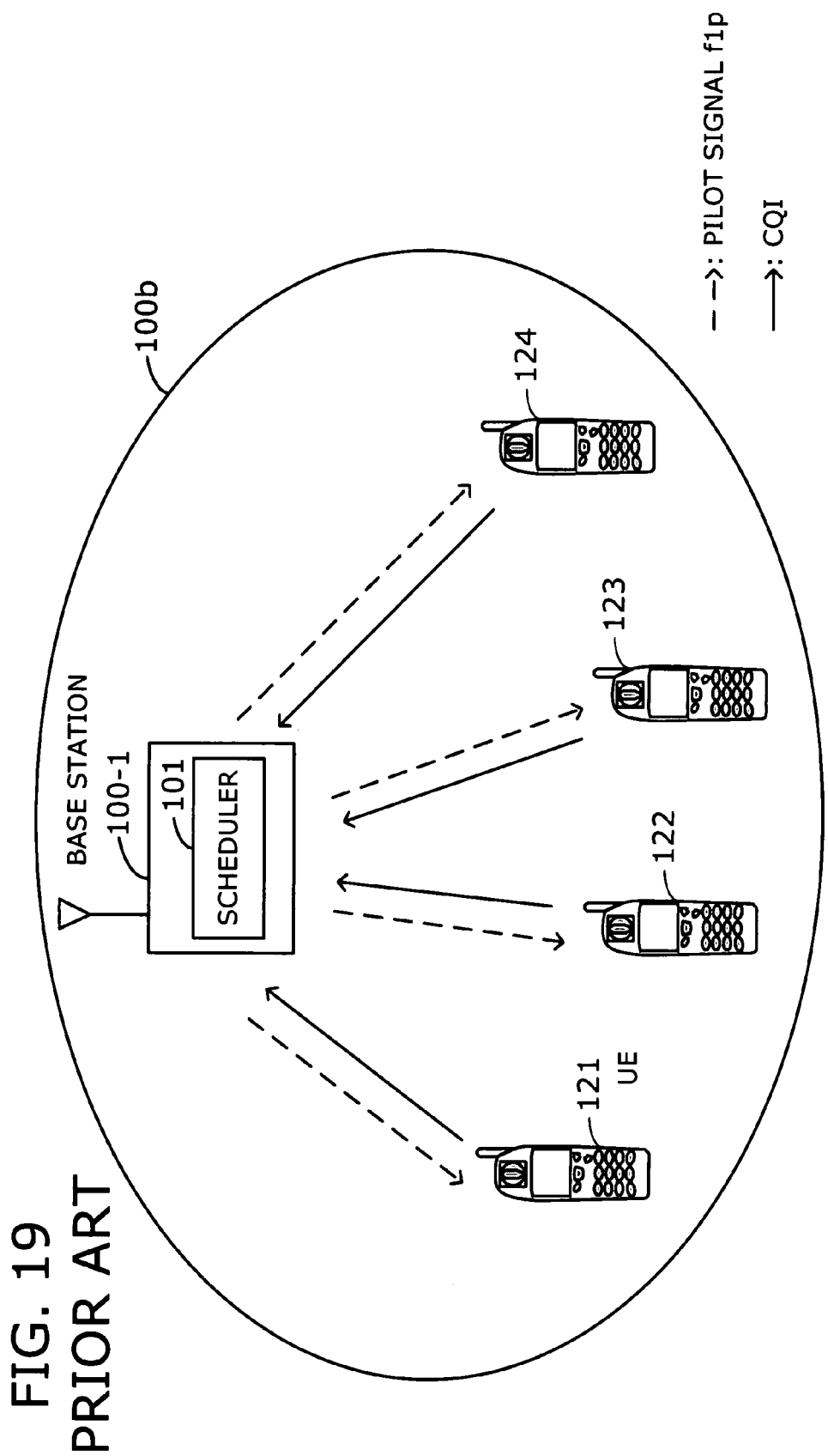
FIG. 19 shows a conventional HSDPA scheduling.
Figure 21:
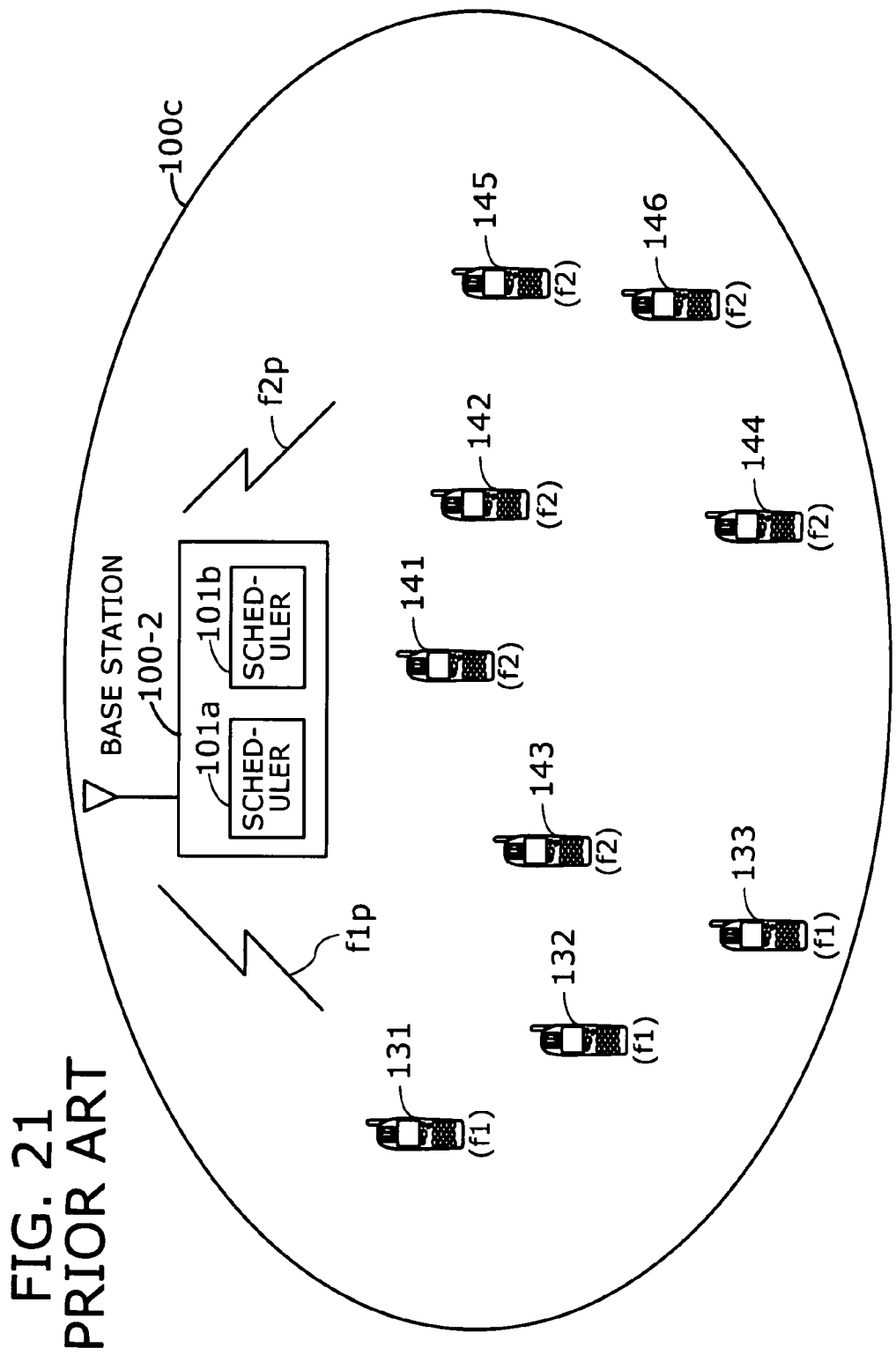
FIG. 21 shows a conventional system with multiple schedulers.
Figure 22:
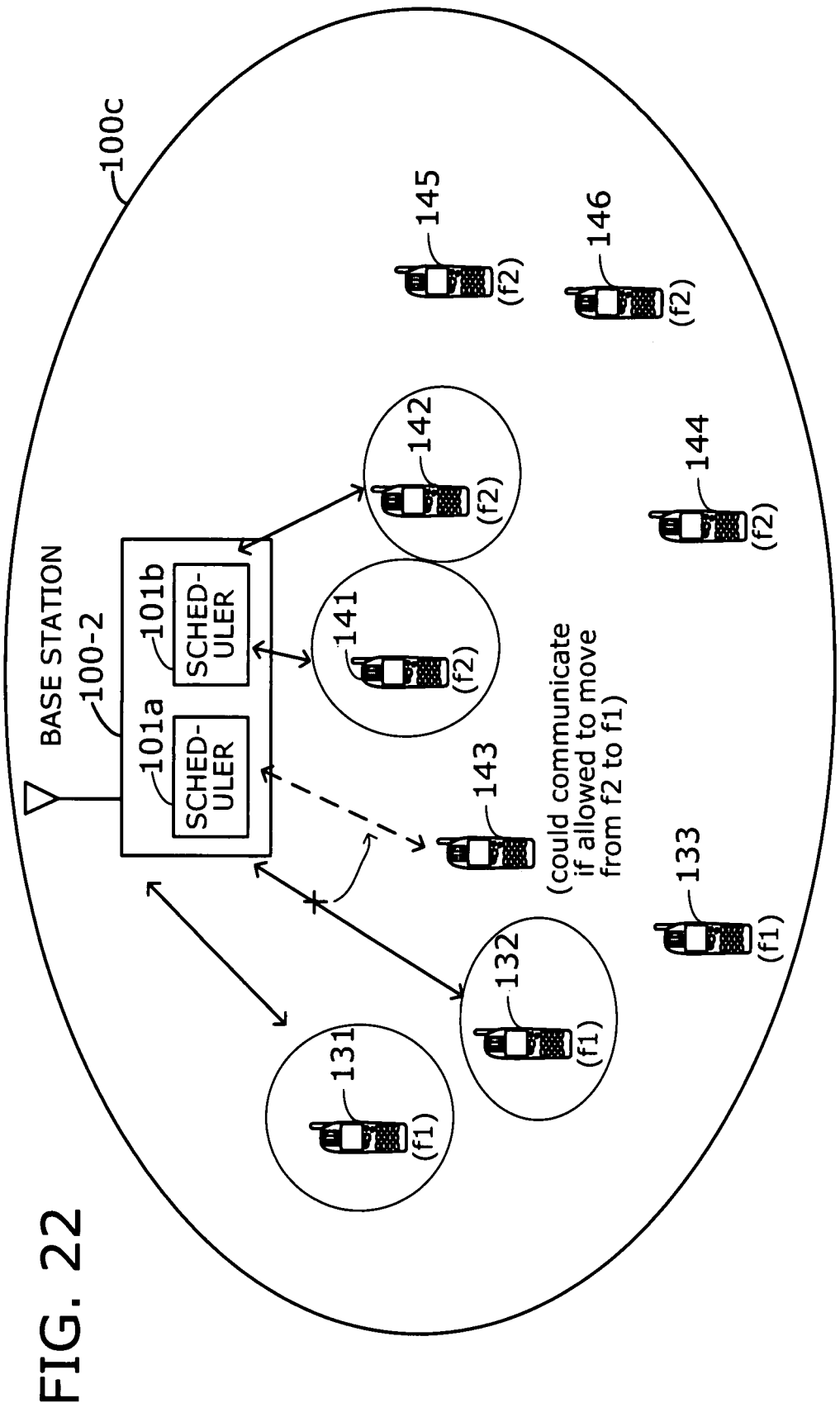
FIG. 22 shows a change in priority.

FIG. 17 shows a scheduling model. It is assumed that UEs 20-1 to 20-5 have been using HSDPA and have returned their respective CQIs 12, 08, 19, 10, and 13 in response to a pilot signal f1*p* with a carrier frequency f1. It is also assumed that UEs 20-6 to 20-10 have been using OFDM and have returned their respective CQIs 04, 16, 15, 17, and 12 in response to a pilot signal f1*p* with a carrier frequency f1. It is further assumed that the UEs 20-1 to 20-10 have transmission rates of 1.0, 3.0, 10.0, 2.0, 0.5, 2.0, 3.0, 2.0, 10.0, and 10.0 (Mbps) in the downlink direction (i.e., from base station to UEs).

The conventional scheduling is based on individual communication services, selecting two high-CQI UEs from the HSDPA group and another two high-CQI UEs from the OFDM group. The data transmission starts with the terminal having the highest CQI. The selection has to be done within the limitation of maximum transmission rates, 14.4 Mbps for HSDPA and 30.0 Mbps for OFDM.

The following discussion starts with the case of conventional scheduling of individual communication services. In HSDPA scheduling, the scheduler discovers that the UE 20-3 has a CQI of 19, the highest of all UEs 20-1 to 20-5 currently using HSDPA communication service, followed by the UE 20-5 with a CQI of 13. The total transmission rate of those two UEs 20-3 and 20-5 is 10.5 Mbps, which satisfies the limitation of ≤14.4 Mbps.

The scheduler then finds that the UE 20-9 has a CQI of 17, the highest of all UEs 20-6 to 20-10 currently using OFDM communication service, followed by the UE 20-7 with a CQI of 16. The total transmission rate of those two UEs 20-9 and 20-7 is 13.0 Mbps, which satisfies the limitation of ≤30.0 Mbps.

The above-described conventional scheduling thus prioritizes the above UEs when providing communication service to UEs 20-1 to 20-10. Specifically, it gives a high priority to UEs 20-3 and 20-5 regarding HSDPA communication service, as well as to UEs 20-9 and 20-7 regarding OFDM communication service. The total transmission rate of HSDPA and OFDM in this case is 23.5 Mbps.

In contrast to the above, the unified scheduling is supposed to select four high-CQI UEs, regardless of whether they are using HSDPA or OFDM, and then assign the first two UEs to OFDM and the remaining two to HSDPA. Specifically, the scheduler finds that the UE 20-3 has a CQI of 19, the highest of all UEs 20-1 to 20-10. Then with a CQI of 17, the UE 20-9 ranks as the second highest. The total transmission rate of those two UEs 20-3 and 20-9 amounts to 20.0 Mbps, which satisfies the limitation of ≤30.0 Mbps.

The third and fourth positions are taken by the UE 20-7 with a CQI of 16 and the UE 20-8 with a CQI of 15, respectively. The total transmission rate of those two UEs 20-7 and 20-8 is 5.0 Mbps, which satisfies the limitation of ≤14.4 Mbps. As a result, the total transmission rate of those four UEs amounts to 25.0 Mbps.

After all, the scheduler chooses one UE 20-3 from the HSDPA group and three UEs 20-7, 20-8, and 20-9 from the OFDM group. The resulting total transmission rate, 25.0 Mbps, is higher than that of the conventional scheduling.

As can be seen from the above explanation, the proposed radio communications system 1 provides a higher transmission rate as the entire system. By handling a plurality of different communication services in a collective manner, the unified scheduling algorithm increases the chance for a terminal device to gain an allocation, which may not happen in the case of separately scheduling individual frequencies. The present invention also smoothes out unevenness in throughput between different systems.

The proposed unified scheduling may take a required transmission rate or other QoS requirements into consideration, which will not only increase the system's total transmission rate but also ensure the fulfillment of a required transmission rate or the like. It is therefore possible to offer services with a minimum guaranteed transmission rate. Further, the scheduler in a base station can determine the necessity of handover, thus executing an inter-frequency handover faster than before.

The above description has assumed HSDPA and OFDM as an example of multiple different communication services. The scheduling function of the present invention is not limited to those specific communication services, but can handle three or more communication services. The present invention can also be applied to other fields of mobile communications technology.

The above description has also assumed that CQI, as propagation environment data, is derived from CIR. Other indexes such as signal-to-interference ratio (SIR or S/I) may instead be used to calculate CQIs.

Further the above description has assumed, for simplicity purposes, the use of a maximum C/I method to prioritize UEs during the course of scheduling. Other appropriate methods include, for example, round robin and proportional fairness algorithms. Round robin algorithm sends a fixed amount of data to each UE in a prescribed time without a particular order, thus giving equal chances of transmission to UEs regardless of their individual receive condition. Proportional fairness algorithm prioritizes high-CQI UEs while ensuring equal total times of transmission to UEs.

According to the radio communications system of the present invention, the base station sends pilot signals with carrier frequencies corresponding to N different communication services and performs scheduling by handling a plurality of communication services in a collective manner, based on N×n instances of propagation environment data received from n terminal devices. Every mobile terminal measures its propagation environment for each carrier frequency in response to received pilot signals and thus returns propagation environment data. When a particular communication service is assigned, the mobile terminals configure their communication functions accordingly. This collective scheduling of a plurality of different communication services increases the chance for a UE to win an allocation which may not be possible in the case of a single-service scheduling, thus balancing the processing load among communication services, enhancing the total transmission rate of the system, and making the radio communications system more operable.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio communications system comprising:
a base station that provides N (N≥2) radio communication systems of M (M≥2) different multiple access schemes at the same time, the base station comprising:

a pilot signal sender that sends pilot signals in each radio communication system for performing scheduling with different carrier frequencies corresponding to the N radio communication systems of different multiple access schemes, the pilot signals having carrier frequencies for a plurality of different communication services and being sent with a common carrier frequency at least in part of the communication services, a scheduler that collects N×n propagation environment information from n (n≥1) terminal devices and selects terminal devices and radio communication systems therefor by assigning terminal devices having a better propagation environment to the plurality of radio communication systems of different multiple access schemes in a collective manner, wherein the scheduler uses, as the propagation environment information, a channel quality indicator indicating condition of a propagation environment to select at most a predetermined number of mobile terminals from a group of mobile terminals having a better propagation environment than others, within an upper limit given as a maximum transmission rate specific to each radio communication system, and a control parameter sender that sends control parameters necessary for the selected radio communication system to each terminal device selected by the scheduler to send data with a shared channel; and mobile terminals capable of receiving the plurality of radio communication systems of different multiple access schemes, each mobile terminal comprising:

a propagation environment data sender that receives the N pilot signals with different carrier frequencies, measures a propagation environment for each of the carrier frequencies, and sends the N propagation environment information back to the base station, and a communication function configurer that sets up a communication function corresponding to the selected radio communication system that the base station has assigned, based on the control parameters.

2. The radio communications system according to claim 1, wherein:
each of the mobile terminals further comprises a QoS information sender that sends QoS information; and
the scheduler receives, in addition to the propagation environment information, the QoS information indicating QoS required by the sending mobile terminal and, upon receipt thereof, selects at most a predetermined number of mobile terminals from a group of mobile terminals having a better propagation environment than others, such that the required QoS will be satisfied by the selected radio communication system, within an upper limit given as a maximum transmission rate specific to each radio communication system.

3. The radio communications system according to claim 2, wherein:
for non-QoS-conscious scheduling, the scheduler previously defines maximum transmit data sizes and modulation methods corresponding to possible values of channel quality indicator; and
for QoS-conscious scheduling, the scheduler determines at least either transmit data sizes or modulation methods flexibly from given values of channel quality indicator.

4. The radio communications system according to claim 1, wherein:
the control parameter sender sends the control parameters including timing information indicating when to start using the selected radio communication system, so that the mobile terminals can set up the communication function thereof beforehand; and
the communication function configurer sets up the communication function corresponding to the selected radio communication system according to the timing information.

5. The radio communications system according to claim 1, wherein the propagation environment data sender sends the N propagation environment information to the base station by using either a plurality of frequencies corresponding to the carrier frequencies of the N pilot signals or a single particular frequency.

6. The radio communications system according to claim 5, wherein the propagation environment data sender produces a code representing the propagation environment information to be sent over the single particular frequency, such that the base station can identify the carrier frequency of each pilot signal deriving the propagation environment information.

7. The radio communications scheduling system according to claim 1, wherein the scheduler initiates a handover between two different radio communication systems or between two different carrier frequencies without intervention of an upper-level station, as a result of a scheduling process that determines priorities of the mobile stations.

8. The radio communications system according to claim 1, wherein:
the pilot signal sender sends the pilot signals with the common carrier frequency for the plurality of different communication services.

9. A base station for radio communication, comprising:
a provider that provides N (N≥2) radio communication systems of M (M≥2) different multiple access schemes at the same time;
a pilot signal sender that sends pilot signals in each radio communication system for performing scheduling with different frequencies corresponding to each radio communication system of different multiple access schemes, the pilot signals having carrier frequencies for a plurality of different communication services and being sent with a common carrier frequency at least in part of the communication services;
a scheduler that collects N×n propagation environment information from n (n≥1) mobile terminals and selects mobile terminals and radio communication system therefor by assigning terminal devices having a better propagation environment to the plurality of radio communication system of different multiple access schemes in a collective manner; wherein the scheduler uses, as the propagation environment information, a channel quality indicator indicating condition of a propagation environment to select at most a predetermined number of mobile terminals from a group of mobile terminals having a better propagation environment than others, within an upper limit given as a maximum transmission rate specific to each radio communication system; and
a control parameter sender that sends control parameters necessary for the selected radio communication system to the mobile terminals selected by the scheduler to send data with a shared channel.

10. The base station according to claim 9, wherein the scheduler receives, in addition to the propagation environment information, QoS information indicating QoS required by the sending mobile terminal and, upon receipt thereof, selects at most a predetermined number of mobile terminals from a group of mobile terminals having a better propagation environment than others, such that the required QoS will be satisfied by the selected radio communication system, within an upper limit given as a maximum transmission rate specific to each radio communication system.

11. The base station according to claim 10, wherein:
for non-QoS-conscious scheduling, the scheduler previously defines maximum transmit data sizes and modulation methods corresponding to possible values of channel quality indicator; and
for QoS-conscious scheduling, the scheduler determines at least either transmit data sizes or modulation methods flexibly from given values of channel quality indicator.

12. The base station according to claim 9, wherein the control parameter sender sends the control parameters including timing information indicating when to start using the selected radio communication system, so that the mobile terminals can set up the communication function thereof beforehand.

13. The base station according to claim 9, wherein the scheduler initiates a handover between two different radio communication systems or between two different carrier frequencies without intervention of an upper-level station, as a result of a scheduling process that determines priorities of the mobile stations.

14. A mobile terminal capable of using a plurality of radio communication systems of different multiple access schemes over radio channels, the mobile terminal comprising:
a propagation environment data sender that receives pilot signals with different carrier frequencies of different multiple access schemes, the pilot signals being sent from a base station in order to perform scheduling, measures a propagation environment for each carrier frequency, and sends propagation environment information back to the base station, the pilot signals having carrier frequencies for a plurality of different communication services and being sent with a common carrier frequency at least in part of the communication services; and
a communication function configurer that sets up a communication function corresponding to a radio communication system that the base station has assigned to the mobile terminal and receives data with a shared channel, based on control parameters sent from the base station;
wherein the base station uses, as the propagation environment information, a channel quality indicator indicating condition of a propagation environment to select at most a predetermined number of mobile terminals from a group of mobile terminals having a better propagation environment than others, within an upper limit given as a maximum transmission rate specific to each radio communication system.

15. The mobile terminal according to claim 14, wherein the propagation environment data sender sends N (N≥1) propagation environment information to the base station by using either a plurality of frequencies corresponding to carrier frequencies of N pilot signals or a single particular frequency.

16. The mobile terminal according to claim 15, wherein the propagation environment data sender produces a code representing the propagation environment information to be sent over the single particular frequency, such that the base station can identify the carrier frequency of each pilot signal deriving the propagation environment information.

17. A method of communicating over a radio network by determining with which entities to communicate and setting up functions of mobile terminals, the method comprising:
providing N (N≥2) radio communication systems of M (M≥2) different multiple access schemes from a base station at the same time;
sending pilot signals in each radio communication system from the base station in order to perform scheduling, the pilot signals having carrier frequencies for a plurality of different communication services and being sent with a common carrier frequency at least in part of the communication services;
performing a scheduling process at the base station, the scheduling process collecting N×n propagation environment information from n (n≥1) mobile terminals and selecting mobile terminals and radio communication systems therefor by assigning mobile terminals having a better propagation environment to the plurality of radio communication systems of different multiple access schemes in a collective manner; wherein
the scheduling process uses, as the propagation environment information, a channel quality indicator indicating condition of a propagation environment to select at most a predetermined number of mobile terminals from a group of mobile terminals having a better propagation environment than others, within an upper limit given as a maximum transmission rate specific to each radio communication system,
sending control parameters necessary for the selected radio communication system from the base station to each mobile terminal selected at the scheduling process to send data with a shared channel;
receiving at each mobile terminal the N pilot signals with different carrier frequencies and measuring therefrom a propagation environment for each carrier frequency;
sending the N propagation environment information from each mobile terminal to the base station; and
based on the control parameters, setting up a communication function in each selected mobile terminal, to start using the radio communication system assigned by the base station.

* * * * *